United States Patent
Kawano et al.

(10) Patent No.: US 9,724,775 B2
(45) Date of Patent: Aug. 8, 2017

(54) METHOD OF MAKING PARTIALLY WELDED SPOTS IN WIRE-CUT ELECTRICAL DISCHARGE MACHINING

(71) Applicant: SEIBU ELECTRIC & MACHINERY CO., LTD., Fukuoka-ken (JP)

(72) Inventors: Masatoshi Kawano, Fukuoka-ken (JP); Keisuke Tasaki, Fukuoka-ken (JP); Takashi Mitsuyasu, Fukuoka-ken (JP)

(73) Assignee: SEIBU ELECTRIC & MACHINERY CO., LTD., Fukuoka-Ken (JP)

( * ) Notice: Subject to any disclaimer, the term of this patent is extended or adjusted under 35 U.S.C. 154(b) by 836 days.

(21) Appl. No.: 14/241,177

(22) PCT Filed: May 22, 2013

(86) PCT No.: PCT/JP2013/064272
§ 371 (c)(1),
(2) Date: Feb. 26, 2014

(87) PCT Pub. No.: WO2013/187201
PCT Pub. Date: Dec. 19, 2013

(65) Prior Publication Data
US 2014/0374385 A1    Dec. 25, 2014

(30) Foreign Application Priority Data
Jun. 13, 2012 (JP) ................. 2012-134030

(51) Int. Cl.
*B23H 7/02* (2006.01)
*B23H 7/04* (2006.01)
(Continued)

(52) U.S. Cl.
CPC ............. *B23H 7/02* (2013.01); *B23H 7/04* (2013.01); *B23H 7/06* (2013.01); *B23K 9/00* (2013.01); *B23K 37/00* (2013.01)

(58) Field of Classification Search
CPC ... B23H 7/04; B23H 7/06; B23H 7/02; B23H 7/38; B23H 7/26; B23H 7/20; B23K 37/00; B23K 9/00; B23K 28/02; B23K 9/0956
(Continued)

(56) References Cited

U.S. PATENT DOCUMENTS 2,594,890 A * 4/1952 Ellwood ................ H01H 9/54
218/143
2,764,668 A * 9/1956 Dumoulin ............ B23K 9/0678
219/130.4
(Continued)

FOREIGN PATENT DOCUMENTS

EP    0534353    3/1993
JP    3366509 B2    11/2002
(Continued)

OTHER PUBLICATIONS

Communication, Search Report from European application No. 13804830, mailed May 9, 2016.

*Primary Examiner* — Eric Stapleton
(74) *Attorney, Agent, or Firm* — Browdy and Neimark, PLLC

(57) ABSTRACT

In a method of welding a cut-out part with a workpiece at a preselected area in a thickness direction of the workpiece in a wire electrical discharge machining to retain temporarily or tentatively the part on the workpiece, a wire electrode 5 tilted in posture cuts the workpiece 6 to form a slant cutting surface 30 at a spark discharge location in a desired contour 21 in the workpiece 6. The wire electrode 5 after kept in an upright posture executes the welding process on the workpiece 6 along the slant cutting surface. A plurality of the welded spots is formed over a preselected length at preselected areas in the thickness direction of the workpiece 6. Even if the cut-out part 26 weighs more or the spark
(Continued)

discharge is executed on the workpiece 6 overlapped one on the other, the welding spot 20 is formed in the thickness direction of the workpiece 6 adequately depending on the working situation to tentatively retain the cut-out part 26 on the workpiece 6.

10 Claims, 13 Drawing Sheets

(51) Int. Cl.
   *B23H 7/06* (2006.01)
   *B23K 9/00* (2006.01)
   *B23K 37/00* (2006.01)

(58) Field of Classification Search
   USPC .............. 219/124.21, 124.34, 69.12, 69.17
   See application file for complete search history.

(56) References Cited

U.S. PATENT DOCUMENTS

| | | | | |
|---|---|---|---|---|
| 2,898,516 A * | 8/1959 | Volff | ................ | B23K 9/0673 219/130.4 |
| 3,322,929 A * | 5/1967 | Mayer | ................ | B23H 7/18 219/69.2 |
| 3,414,656 A * | 12/1968 | Lunig | ................ | H05B 7/11 336/175 |
| 3,444,430 A * | 5/1969 | Needham | ................ | B23K 9/073 219/130.4 |
| 3,600,981 A * | 8/1971 | Wagner | ................ | B23H 1/04 219/69.15 |
| 3,614,694 A * | 10/1971 | Koontz | ................ | H01F 19/08 333/26 |
| 3,678,341 A * | 7/1972 | Constable | ................ | H02H 9/04 336/175 |
| 3,809,852 A * | 5/1974 | Weber | ................ | B23H 7/28 219/69.2 |
| 3,952,179 A * | 4/1976 | Baker | ................ | B23H 9/00 219/69.11 |
| 4,418,265 A * | 11/1983 | Tabata | ................ | B23K 9/0678 219/130.4 |
| 4,544,820 A * | 10/1985 | Johnson | ................ | B23H 9/12 219/69.15 |
| 4,618,760 A * | 10/1986 | Murch | ................ | B23K 9/0678 219/130.4 |
| 4,767,912 A * | 8/1988 | Eldridge | ................ | B23K 9/0673 219/130.4 |
| 4,820,894 A * | 4/1989 | Francois | ................ | B23H 11/00 204/206 |
| 5,242,555 A * | 9/1993 | Buhler | ................ | B23H 7/06 204/297.06 |
| 5,556,554 A * | 9/1996 | Morishita | ................ | B23H 7/02 219/69.12 |
| 5,629,842 A * | 5/1997 | Johnson | ................ | B03C 3/66 363/44 |
| 6,995,337 B2 * | 2/2006 | Blankenship | ................ | B23K 9/091 219/130.1 |
| 8,476,548 B2 * | 7/2013 | Mitsuyasu | ................ | B23H 7/04 219/69.12 |
| 2007/0205184 A1 * | 9/2007 | Mazumder | ................ | B23H 9/00 219/69.17 |
| 2008/0203069 A1 * | 8/2008 | Kao | ................ | B23H 1/02 219/69.17 |
| 2012/0193326 A1 * | 8/2012 | Mitsuyasu | ................ | B23H 7/04 219/69.17 |

FOREIGN PATENT DOCUMENTS

| | | |
|---|---|---|
| JP | 4480822 B2 | 3/2010 |
| JP | 2012-166332 A | 9/2012 |

\* cited by examiner (A)

(B)

METHOD OF MAKING PARTIALLY WELDED SPOTS IN WIRE-CUT ELECTRICAL DISCHARGE MACHINING

FIELD OF THE INVENTION

The present invention relates generally to a wire electrical discharge machining in which a part or product to be cut out from workpiece of strips, plates or sheets is temporarily or tentatively retained on the workpiece with making partially welded spots integral with the workpiece to keep the machined parts or products against falling away from the workpiece, and more particularly, this invention relates to a method of cutting a part or product out from a workpiece while making a welded spot on the part or product.

BACKGROUND OF THE INVENTION

Conventionally, the wire-cut electrical discharge processors are sometimes used in gouging of dies. On spark discharge machining of workpiece in the wire-cut electrical discharge processors, the die plate processing is at times carried out in which a start hole is provided on the side of workpiece ordinarily called core. With the die plate processing, the wire-cut electrical discharging is completed through working steps including rough processing or cutting, semi-finishing, finishing, final finishing and so on. At the phase just before the end of a first process, hereinafter referred as first process, corresponding to the rough processing in every working step, the spark discharging comes to a halt to leave any uncut spot between the part and workpiece to keep the cut-out part or product against falling away from the workpiece. After the spark discharging has then continued on the uncut spot, the part or product is separated from the workpiece to drop under its own weight or external impact. Even if the wire-cut electrical discharge processor is energized while the part or product is in the possibility of falling away or drop from the workpiece, there occur a serious fear of damaging any of the wire-cut electrical discharge processor itself, part or product, and workpiece. Thus, it will be understood that the fear as stated earlier has to be sidestepped. Because of this, the spark discharging in the prior die plate process is temporarily withheld so as not to completely separate or cut out the part from the workpiece, and the workers break manually the uncut spots later on to separate the part from the workpiece, thereby ending the first process.

A conventional wire-cut electrical discharge machining process is disclosed in, for example patent literature 1, referred later, in which the first machining phase and the second cut-off phase are both carried out with only one processing program. With the prior wire-cut electrical discharge machining process, a cutting pathway program, uncut amount and reversing or receding amount to cut off every male pattern are set and input. The first machining phase comes to rest with leaving the uncut amount and stores the location or spot. In the second machining phase to cut off the uncut amount, the wire electrode after having gotten back from the stored location along the cutting path or kerf by the programmed uncut amount makes automatic connection and resumes the electrical-discharge at the site to cut off the male pattern.

In another patent literature 2, referred later, which is a commonly-assigned senior application, the immersion wire electrical discharge machining processor is disclosed in which the buoyancy member supports the part or product cut out from the workpiece to prevent the short-circuit which would be otherwise occur between the cut-out part and the wire electrode, thereby supporting a heavy part in safety. The buoyancy member less in specific gravity than processing liquid is underneath the workpiece. The buoyancy developed in the buoyancy member owing to the processing liquid floats the parts cut out from the workpiece by the wire electrode so as not to sink in the processing liquid.

PRIOR ART LITERATURES

Patent Literatures

Patent literature 1: Japanese patent no. 3 366 509
Patent literature 2: Japanese patent no. 4 480 822

SUMMARY OF THE INVENTION

Subject to be Solved by this Invention

On the prior electrical discharge process to produce the part of preselected shape, however, the part has to be cut out with leaving uncut spots to keep the part against falling apart from the workpiece or scrap. Thus, the prior electrical discharge process has need of an additional step to isolate the part apart from the workpiece later on and an additional device for recovery of the products of workpiece. This means that the prior electrical discharge process takes a great deal of time to isolate the part such as a core from the workpiece, lowering in the rate of operation. To overcome the shortcoming as stated just earlier, looking at the electrical discharge phenomenon of a qualitatively long interval which causes a breakdown between the metal electrodes lying in a gaseous insulator, it was found that the breakdown starts with a corona discharge phase, then going through a spark discharge phase and an arc discharge phase in sequence, and runs out. Thus, it has been developed to control voltage-current characteristics so as to conduct the discharge process at the spark discharge and the arc welding or plasma welding at the arc discharge or plasma discharge. Based on the consideration of the discharge phases as stated just above, the technical concept is motivated in which the wire electrode is used for the electrical discharge process or spark discharge to cut out the part from the workpiece and for arc welding to make a coalescence of the part with the workpiece at a preselected spot to retain temporarily the part on the workpiece.

The commonly-assigned senior Japanese Laid-Open Patent Application No. 2012-166 332 discloses the technical concept as stated just earlier in which the wire electrode is used for spark discharge to cut out the part from the workpiece and for arc welding to make a coalescence of the part with the workpiece to retain temporarily the part on the workpiece.

Meanwhile, with the method of producing the cut-out part or core with making partially welded spots integral with the workpiece in a cutting path or kerf of a predetermined contour in the arc welding phase of the wire electrical discharge process, the part or core is welded only at upper limited spot of the overall thickness of the part. It remains a problem that after a plurality of workpiece overlapped one over the other has been cut out by spark discharge machining while making welded spots at a preselected location, the part cut out from the underlying workpiece probably remains unwelded at a desired location and therefore there is a fear the cut-out part would fall apart from the workpiece. Moreover, when the workpiece is large in thickness or heavy in weight, there is serious possibility that the welded spot is too less in strength to sustain the heavy cut-out part and therefore the cut-out part falls apart from the workpiece. Thus, in order to avoid the shortcoming of the fall of the cut-out part in the method of cutting a part or product out from a workpiece while making a welded spot on the part or product as stated earlier, it remains a major challenge to weld the cut-out part with the workpiece at any desired location in a thickness direction of the workpiece, for instance, at a lower spot or intermediate spot in the thickness direction of the workpiece, or at a plurality of spots in the thickness direction of the workpiece or at the underlying cut-out part in a plurality of the workpiece overlapped one over the other The present invention, therefore, has as its primary object to overcome the problem as described above. In light of the method of welding the cut-out part with the workpiece disclosed in the commonly-owned senior application in which the part such as a core cut out from the workpiece is welded with the workpiece only at an upper surface or an area near the upper surface of the workpiece on an ingress side of the workpiece for the wire electrode, the present invention provides a method of welding the part with the workpiece while cutting the part out of the workpiece in the wire-electrode discharge comprising the steps of, previously rough cutting the workpiece to make a cutting surface or kerf in the workpiece, and welding the cut-out part with the workpiece at welding spots or coalesces extending along the cut surface or kerf across a preselected interval at a preselected area in a thickness direction of the workpiece or at a plurality of areas in a thickness direction of the workpiece to retain tentatively the cut-out part on the workpiece, thereby securely keeping the cut-out part against falling away from the workpiece. As an alternative in which a plurality of workpiece overlapped one over the other is cut out by spark discharge while welded at a preselected location in depth or in the thickness of the overlapped workpiece, the underlying cut-out part is securely welded to the workpiece and therefore protected from falling apart from the workpiece.

Means to Overcome the Subject

The present invention is concerned with a method of welding a cut-out part with a workpiece in wire electrode discharge machining, comprising of the steps of cutting a part to be separated from the workpiece with electrical discharge using spark energy generated by application of an inter-electrode voltage which occurs across a wire electrode and the workpiece lying in opposition to the wire electrode and, in doing so, changing an electrical processing condition applied across the wire electrode and the workpiece from a cutting phase to a welding phase at a preselected spot in a cutting path or kerf of the part, fusing at least partially the wire electrode and welding the part with the workpiece at the spot in a preselected contour of the part to retain the part on the workpiece, and further comprising of the steps of changing the electrical processing condition to the cutting phase at a preselected spot to weld the part with the workpiece, thereby carrying out the discharge machining to rough cut the workpiece in a thickness direction of the workpiece along a cutting contour in the workpiece to form a rough cut surface on the part, and then tilting the wire electrode in posture with respect to the rough cut surface lying in the thickness direction of the workpiece, subsequently changing the electrical processing condition to the welding phase to execute a welding process on the workpiece along the rough cut surface thereby forming the welded spot to weld the part with the workpiece along the rough cut surface at an ingress side of the workpiece for the wire electrode, the welded spot extending over a preselected length at a preselected area in the thickness direction of the workpiece to retain the part on the workpiece with the welded spot.

In the following description of the present invention, the terms "perpendicular, upright" used regarding the wire electrode or workpiece are envisaged including not only the exact right angle or 90 degrees with respect to upper and lower surfaces of the flat workpiece, but a substantially perpendicular or upright near to 90 degree involving nearly perpendicular and roughly perpendicular. The terms "lean, tilt, incline, slant" used regarding the wire electrode and workpiece are envisaged including the substantial incline relative to upper and lower surfaces of the flat workpiece.

In a method of welding a cut-out part with a workpiece in wire electrode discharge machining constructed as stated earlier, the rough cut surface on the workpiece is a slant cutting surface which is rough cut with the wire electrode while tilting or kept tilted with respect to the upper and lower surfaces of the workpiece, and then after wire electrode is changed from a tilted posture lying on the slant cutting surface to a substantially upright posture perpendicular to the upper and lower surfaces of the workpiece, the welding process is carried out along the slant cutting surface at an ingress side of the workpiece for the wire electrode upward from a lower end of the slant cutting surface to form the welded spot of the preselected length at the preselected area in the thickness direction of the workpiece.

Moreover, the welded spot to join the cut-out part with the workpiece is formed at a preselected location lying upward from a lower side of the slant cutting surface over a preselected length in the thickness direction of the workpiece The slant cutting surface on the workpiece is spark charge machined with using the wire electrode kept in a tilted posture in which an upper head goes ahead of a lower head along a desired cutting contour in the workpiece. Further, the slant cutting surface spark discharged on the workpiece is composed of two partially slant cutting surfaces intersected each other to form an uncut peak midway between the upper and lower surface of the workpiece, and the welded spot is formed at the uncut peak.

In a method of welding a cut-out part with a workpiece in wire electrode discharge machining of the present invention, the rough cut surface on the workpiece is a substantially upright surface rough cut in the workpiece by the wire electrode kept at an upright posture substantially perpendicular to the upper and lower surfaces of the workpiece, and the welding process is executed on the workpiece along the rough cut surface thereby forming the welded spot to weld the part with the workpiece along the rough cut surface at an ingress side of the workpiece for the wire electrode, the welded spot extending over a preselected length at a preselected area in the thickness direction of the workpiece.

Moreover, the upper head to feed the wire electrode is moved to go back of the lower head along the cutting path or kerf made in the workpiece to get the wire electrode tilted in posture.

In a method of welding a cut-out part with a workpiece in wire electrode discharge machining of the present invention, the upper head to feed the wire electrode is advanced ahead of the lower head to increase an angle of inclination of the wire electrode relative to the upper surface and the lower surface of the workpiece thereby to form the welded spot along the upright rough cutting surface while varying the angle of inclination of the wire electrode.

In a method of welding a cut-out part with a workpiece in wire electrode discharge machining of the present invention, the welded spot on the rough cut surface is formed at one or more locations along the rough cut surface of the workpiece. Moreover, the spark discharge is carried out in the thickness direction of the workpiece composed of a plurality of layers overlapped one on the other to form the welded spot to join the part with the workpiece at least an undermost layer to retain the part on the workpiece.

Advantageous Effects of the Invention

With the method of welding a cut-out part with a workpiece in wire electrode discharge machining of the present invention constructed as stated earlier, the substantial slant cutting surface or the substantial upright cutting surface at the ingress side of the workpiece for the wire electrode is accounted to be the imaginative upper cutting surface of the workpiece at the ingress side for the wire electrode at the spark discharge location for the desired contour to be discharged cut in the workpiece, so that one or more welded spot may be formed over a preselected distance at a preselected area in the thickness direction of the workpiece. As a result, even if the cut-out part weighs more or the spark discharge is executed on the workpiece overlapped one on the other, the welding spot is formed in the thickness direction of the workpiece at a plurality of locations or over a desired length adequately depending on the working situation to tentatively retain the cut-out part on the workpiece.

Namely, when the imaginative upper slant surface or upright surface is rough cut in advance and then the welding process is executed with the wire electrode tilted relative to the imaginative upper surface, the welded spot to join the cut-out part with the workpiece is formed along the imaginative upper surface of the workpiece at the ingress side for the wire electrode. For instance, when the upper head is moved while going ahead of the lower head, the wire electrode gets tilted in posture and in doing so the wire electrode while kept in the tilted posture rough cuts the workpiece with spark discharge to make the slant rough cutting surface in conformity with the tiled wire electrode. Thereafter, the upper head is moved to go back to the position of the lower head to alter the wire electrode in posture to the upright posture substantially perpendicular to the upper and lower surfaces of the workpiece, in other word, the wire electrode comes into the tilted or inclined posture relative to the slant rough cut surface. Thus, when the welding phase is executed with the wire electrode being in the posture as stated just earlier, the welded spot would be formed over a preselected distance along the slant rough cut surface at a preselected spot, or at a plurality of preselected spots according to circumstances.
As a result, the cut-out part is joined with the workpiece with the welded spot or spots to be retained tentatively with the workpiece.

As an alternative, after the upper head and the lower head have been set in such a relation as to keep the wire electrode in an upright posture substantially perpendicular to the upper and lower surfaces of the workpiece, the workpiece is rough cut with spark discharge using the wire electrode lying in the upright direction to form the upright rough cut surface. Subsequent, the upper head is moved to go back of the lower head to get the wire electrode tilted with respect to the upright rough cut surface and then the welding phase is executed with the wire electrode from the lower end of the upright rough cut surface at the ingress side of the workpiece for the wire electrode to thereby form the welded spot extending upright from the lower end, or a preselected location or locations, of the upright rough cut surface over a preselected length in the thickness direction of the workpiece.

Thus, the cut-out part is joined with the workpiece with the welded spot or spots to be retained tentatively with the workpiece.

By repetition of alternate execution of the rough cutting step and the welding step on the workpiece, a plurality of welded spots may be made at fixed intervals in the thickness direction of the workpiece to join the cut-out part with the workpiece thereby to retain tentatively the cut-out part on the workpiece.

With the method of welding a cut-out part with a workpiece in wire electrode discharge machining of the present invention, moreover, when the spark discharge is still short of the completion around the cutting contour in the workpiece after the welding phase has finished between the cut-out part and the workpiece, the electrical processing condition is switched over from the welding phase to the cutting phase to further execute the spark discharge machining on the workpiece.

BRIEF DESCRIPTION OF THE DRAWINGS

FIG. 3(A) is a wave form chart showing a voltage wave form and a current wave form in a routine machining phase in basic circuit of FIG. 2 and FIG. 3(B) is a wave form chart showing a voltage wave form and a current wave form in a welding phase in basic circuit of FIG. 2 to make a coalescent spot or a welded spot between the part and the workpiece.

FIG. 5(A) is a wave form chart showing a voltage wave form and a current wave form in a routine machining or cutting phase in the circuit of FIG. 4 and FIG. 5(B) is a wave form chart showing a voltage wave form and a current wave form in a welding phase in circuit of FIG. 4 to make a coalescent spot or a welded spot between the part and the workpiece.

FIG. 7(A) shows the parts of rectangular shape cut out from the workpiece along a cutting line starting with a start hole and welded together with the workpiece at two spots and FIG. 7(B) is an exaggeratingly enlarged view in perspective showing the workpiece in which dotted lines depict cutting or machining tracks of the tool or the wire electrode in the electrical discharge machining process.

DETAILED DESCRIPTION OF THE PREFERRED EMBODIMENTS

Figure 1:
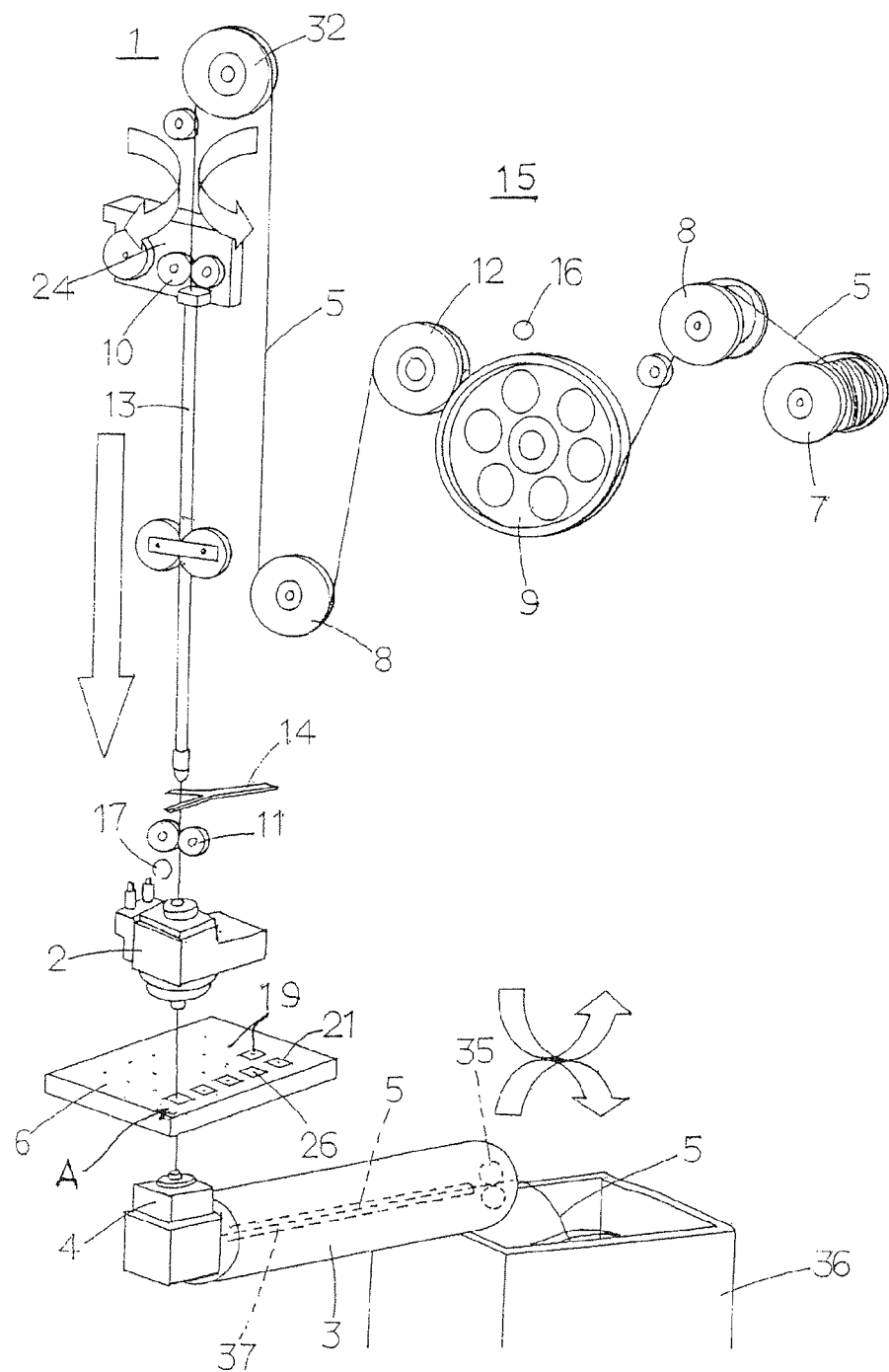
FIG. 1 is a schematic view illustrating a preferred embodiment of a wire electrical discharge processor to carry out a method of cutting out a part with making partially welded spots in wire-cut electrical discharge machining according to the present invention.

A preferred embodiment of the wire electrical discharge processor to carry out the method of cutting the part with making welded spots in wire electrical discharge machining according to the present invention will be hereinafter described in detail with reference to FIG. 1.

The wire-cut electrical discharge processor is generally composed of a source bobbin 7 mounted on a machine frame 15 and having wire electrode coils 5 wound around the bobbin 7, change-of-direction rollers 8 to control threading directions of the wire electrode 5 unwound out of the bobbin 7, a brake roller 9 to keep the delivery of the wire electrode better, a tension roller 12 to apply a tensile force to the delivered wire electrode 5 and a guide roller 32 to turn the wire electrode 5 towards a feeder tube 13. The wire electrode 5, after moving past the change-of-direction rollers 8 and the guide roller 32 in a wire-supply system, travels through a pair of wire-delivery rollers 10 serving as annealing rollers installed in a machine head 1, a feeder tube 13 suspended below a wire-electrode delivery unit 24 and a pair of common rollers 11 in order as stated above to stretch between the wire-delivery rollers 10 and the common rollers 11. Then, after the wire electrode 5 is firmly gripped by the wire-delivery rollers 10 and the common rollers 11, an electric current from a power source is applied to the wire electrode 5 through an electric feeder brush 18, see FIGS. 2 and 4, to flow through the wire-delivery rollers 10, wire electrode 5 and the common rollers 11, thereby annealing the wire electrode 5 extending between the wire-delivery rollers 10 and the common rollers 11 to remove stresses, deformation such as warp. An end of the wire electrode 5, not subjected to the heat-treatment of annealing, is cut off with a cutter 14 to be removed and thus the wire electrode 5 is kept straight. Subsequently, as the feeder tube 13 suspended below a tube holder in the wire-electrode delivery unit 24 continues descending in response to the energization of the wire delivery rollers 10, the annealed wire electrode 5 is guided along the feeder tube 13 and threaded through an upper head 2. Moreover, the workpiece 6 to be subjected to the spark discharge process is secured by clamps 25 to a work table 23 which is in a processing bath.

Between the annealing rollers 10 and the common rollers 11, there is provided the cutter 14 to cut off the end of the wire electrode 5 at the renewal of wire-end to render the wire electrode 5 preferable for threading, the breakage of the wire electrode 5, the execution of annealing process and so on. Moreover, there is installed a clamp, not shown, to dispose the waste wire-electrode 5 cut off by the cutter 14 which is actuated with a cutter unit to cut the wire electrode 5. Upon the resumption of threading after the breakage of the wire electrode 5, the wire-delivery rollers 10 rotate at a low velocity to advance the wire electrode 5 through the feeder tube 13 into the upper head 2. The wire electrode 5, after having advanced past the upper head 2, is threaded through a start hole, cutting path or kerf 19 in the workpiece 6 and then received in a lower head 4 lying below the workpiece 6 in opposition to the upper head 3. After the wire electrode 5 has been threaded past the lower head 4, the wire delivery rollers 10 was shifted to high-speed rotation to advance the wire electrode 5 out of the lower head 4. The wire electrode 5 pulled out of the lower head 4 is led in turn through a change-of-direction roller, a wire guide tube 37, a water separator located at an egress of the wire guide tube 37, all of which are installed inside the lower arm 3. Further, the wire electrode 5 is pulled out by winding rollers 35 lying downstream of the water separator and successively forced into a waste-wire hopper 36 by means of any suction means farther downstream of the winding rollers. An encoder 16 to detect the rpm of the brake roller 9 is installed on the brake roller 9 and a sensor 17 is installed on a lower supporter, not shown, of the machine head 1 to monitor any distortion, bending, threading conditions and so on caused in the wire electrode 5.

Figure 7:
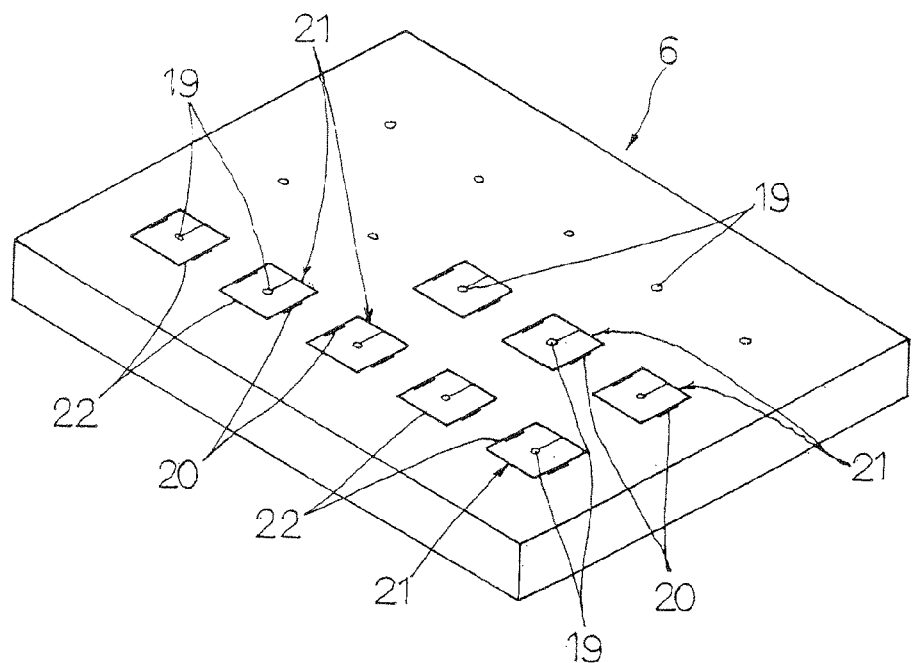
FIG. 7 is a schematic diagram illustrating a geometric relation between the cut-out parts and the workpiece in a method of cutting the part with making welded spots in wire-cut electrical discharge machining.
Figure 7:
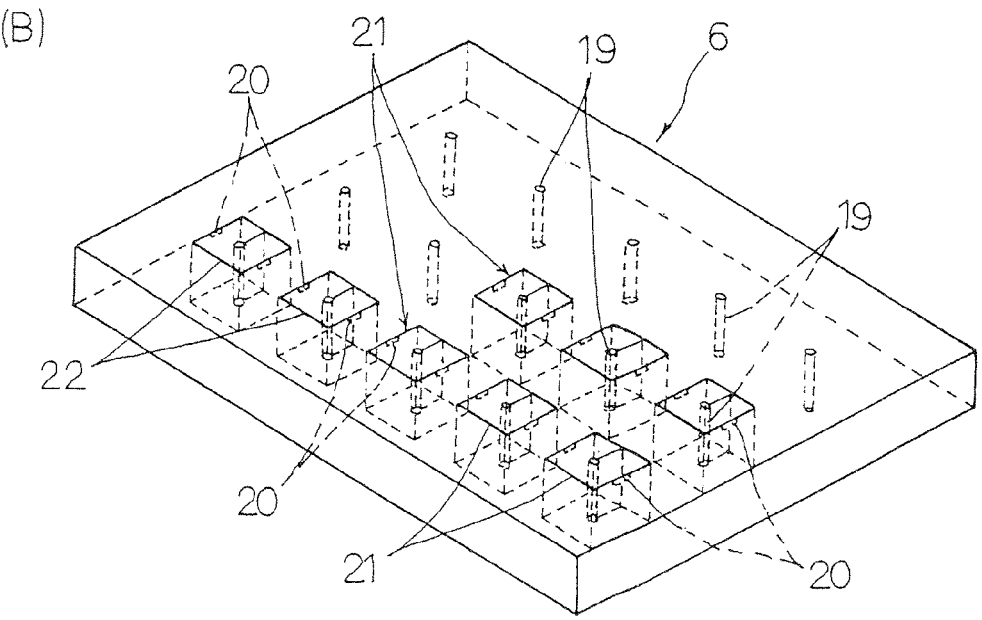

The workpiece 6 processed in the wire-cut electric discharge processor of the present invention is selected from, for example, iron series or carbide products. The wire electrode is metallic material including for example tungsten series, copper alloy series (brass family), piano wires and so on. As an alternative, a composite material may be used in which the metallic material as stated earlier is used as a core member and clad with other metallic member. For example, the core member made of material other than copper alloy family is clad with copper alloy family. In contrast, the core member made of copper alloy family is clad with zinc family and so on. With the embodiment discussed now, the workpiece 6 is made in a flat sheet or plate as shown in FIG. 7. The wire electrode 5, after threaded through any of the start holes 19 and cutting paths or kerfs, is supplied with an electric current via the electrical feeder brush 18 and a potential difference is applied across the wire electrode 5 and the workpiece 6 to carry out the electrical-discharge machining of the workpiece, thereby the cut-out part or product 26 is produced. In the threading phase in which the wire electrode 5 is introduced successively through the upper head 2, start hole or kerf cut in the workpiece 6 and the lower head 4, the foremost edge of the wire electrode 5 sometimes comes into abutment or collision against any one of the member as stated just earlier, failing to thread through across all the members. When the wire electrode 5 gets buckled, warped or bent because of the abutment of the wire electrode 5 against any of the members as stated just above, the distortion occurring in the wire electrode 5 is detected with sensor 17.

More especially, the potential difference is applied across the wire delivery rollers 10 and an upper end of a guide-tube holder or the sensor 17. Thus, when the wire electrode 5 comes into contact with the sensor 17, the distortion in the wire electrode 5 is detected with sensor 17. The wire electrode 5 is applied with potential difference under such condition that the wire-delivery rollers 10 are fed with electricity while the wire-delivery rollers 10 are closed each other to grip the wire electrode 5 between them. Thus, the abutment or collision of the wire electrode 5 applied with potential difference can be detected with the sensor 17.

A method of making welded spots or coalescence in wire-cut electrical discharge using the wire-cut electrical discharge machine according to the present invention, although aimed at cutting out the part 26 along the desired contour 21 from the workpiece 6, is especially features the steps of fusing partially the wire electrode 5 in the cutting path or kerf to make fused area on the wire electrode 5 to weld the cut-out part 26 with the workpiece 6 to keep temporarily the cut-out part 26 in the workpiece 6. The fused area in the wire electrode 5 is limited to only a wire periphery over a predetermined length of the wire electrode 5 to make certain that the wire electrode 5 is fed continuously without interruption even after the wire electrode 5 has been partially fused to weld together the cut-out part 26 with the workpiece 6.

In the method of cutting the workpiece with making welded spots of the present invention, the wire electrode 5 containing copper alloy series is better for the welding of the cut-out part 26 with the workpiece 6. According to the method of joining the cut-out part with the workpiece at the welded spots, the wire-delivery rollers 10 mounted on the machine head 1 pinch between them the wire electrode 5 unwound from the source bobbin 7 installed on the machine frame 15. As the wire-delivery rollers 10 is driven, the wire electrode 5 is threaded through the feeder tube 13, upper head 2, workpiece 6 set below the upper head 3 and the lower head 4 lying just below the workpiece 6 in opposed alignment with the upper head 3. The wire electrode 5 is further pulled out by the winding rollers 35 to run through the guide unit lying below the lower head 4 into the waste-wire hopper 5. With the method of making welded spots according to the present invention, more especially, the electrical processing condition to apply the potential difference across the wire electrode 5 and the workpiece 6 is switched from the cutting or machining phase to the welding phase at more than one spot in the cutting path or kerf 21 to define a predetermined contour of the workpiece 26. In the welding phase of the electrical processing condition, the wire electrode 5 is fused partially to provide welded spots 20 at preselected locations in the cutting path 21, where the workpiece 26 is welded together with the workpiece 6 to be held in the workpiece 6 so as not to fall apart from the workpiece 6. As the welded spots 20 between the workpiece 26 and the workpiece 6 as shown in FIG. 7 are placed diametrically opposite with each other, the part 26 is kept in well-balanced posture inside the workpiece 6. With the method of making welded spots according to the present invention, moreover, the wire electrode 5 can break in the welding phase where the wire electrode 5 is fused to weld together the cut-out part 26 and the workpiece 6. Upon breakage of the wire electrode 5, the wire electrode 5 is newly resupplied into cutting path or kerf 22 at the breakage spot to continue welding of the workpiece 26 with the workpiece 6. As an alternative, the electrical-discharge machining or cutting may be followed by means of the newly resupplied wire electrode 5. The cut-out part 26, according to circumstances, is either of the products and the scraps.

Figure 3:
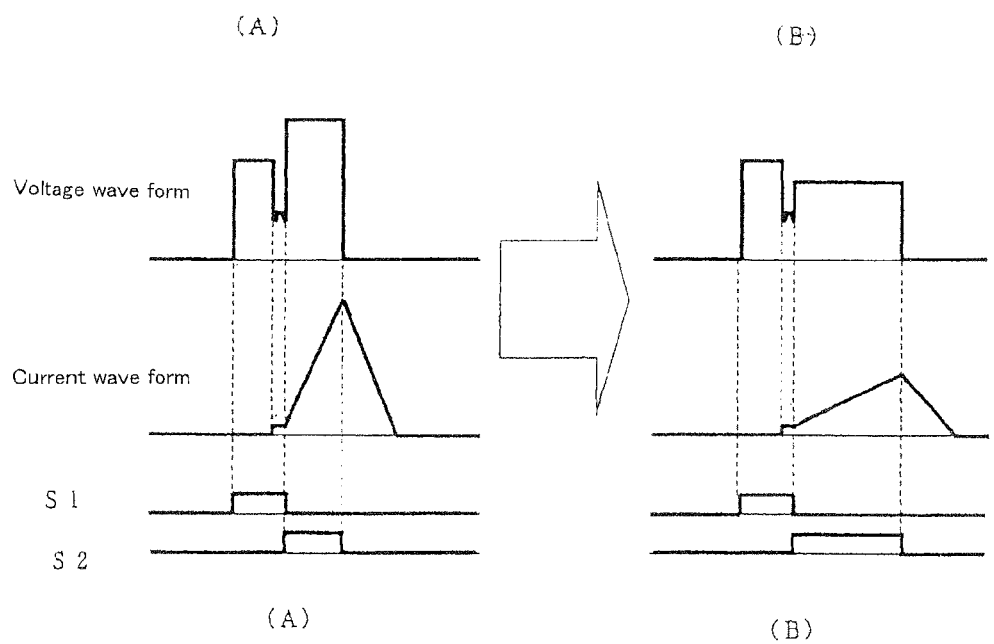
FIG. 3 is a wave form chart illustrating a voltage wave form at the upper and a current wave form at the lower on on/off control of switches S1 and S2 in the circuit of FIG. 2.
Figure 5:
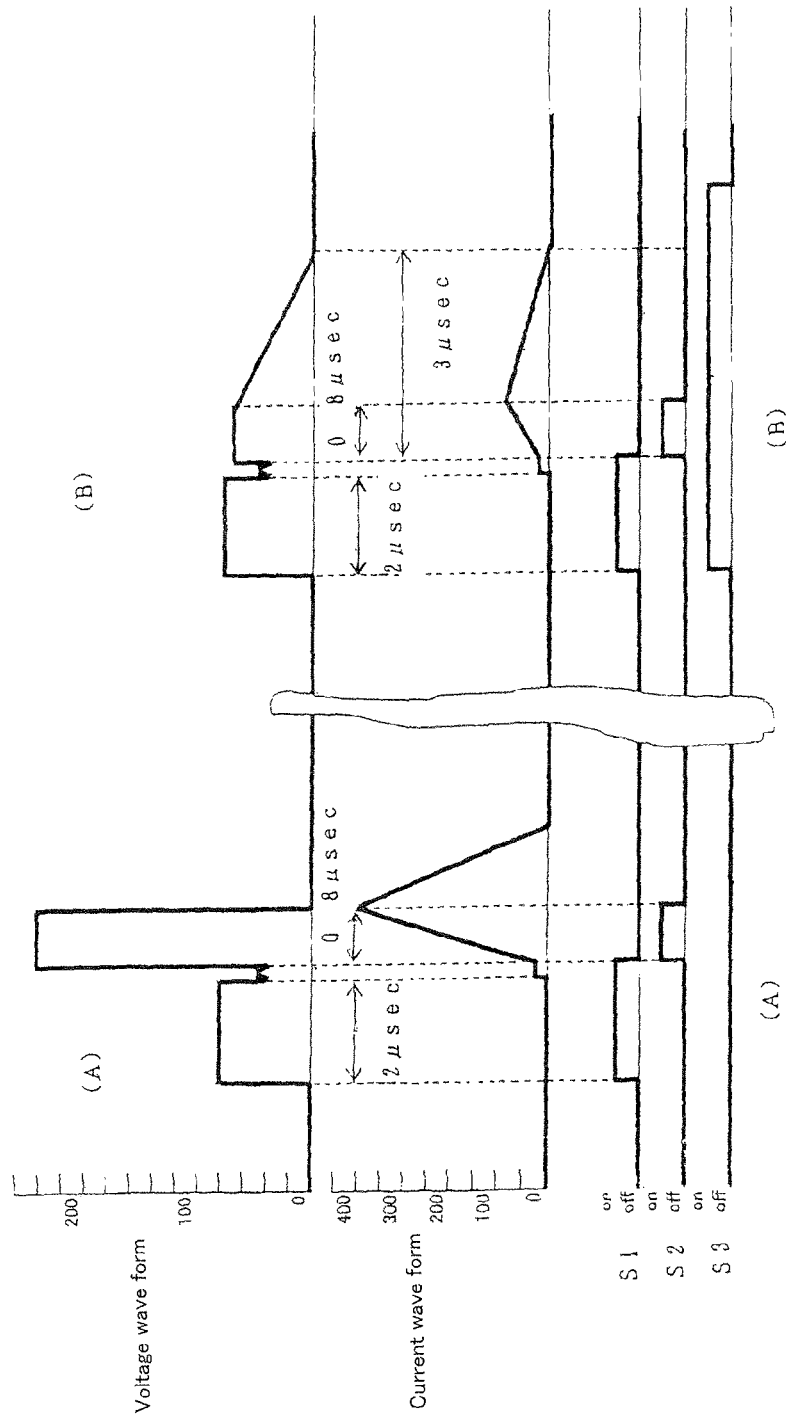
FIG. 5 is a wave form chart illustrating a voltage wave form at the upper and a current wave form at the lower on on/off control of switches S1, S2 and S3 in the circuit of FIG. 4.
Figure 8:
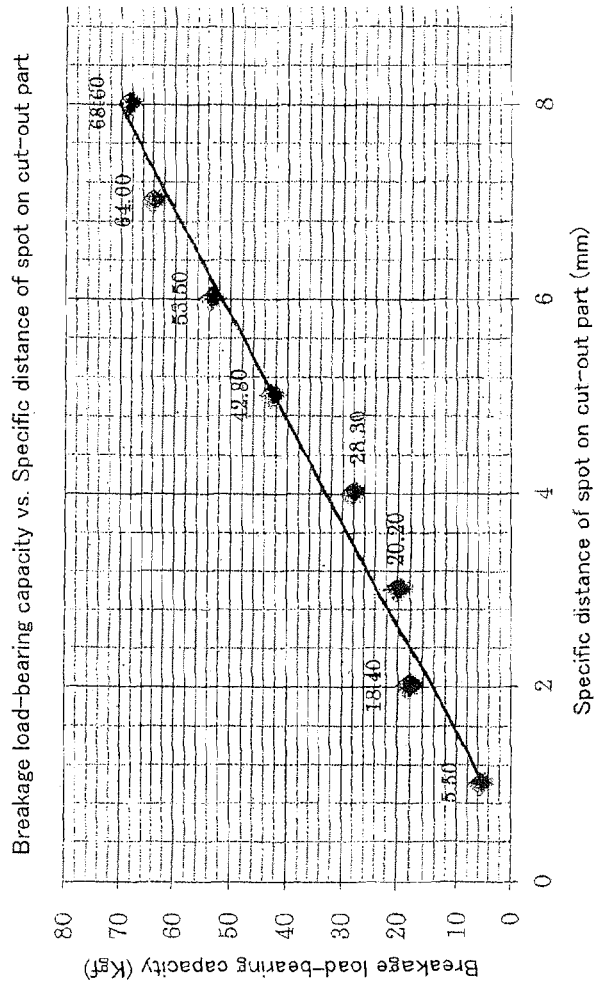
FIG. 8 is graphic representations showing the result of withstand load tests to break the welded spots made between the cut-out part and the workpiece.

On switching of the electrical processing condition from the cutting phase to the welding phase in the method of making the welded spot to connect the cut-out part with the workpiece of the present invention, a current flow (A) into the wire electrode 5, as seen in FIGS. 3 and 5, is controlled in such a way that a peak current flowing from a high-voltage load HV into the wire electrode 5 is decreased down to, for example about a quarter compared with the current in the wire electrical discharge machining to cut the workpiece 6, and a potential difference (V) applied across the wire electrode 5 and the workpiece 6 is reduced to, for example about a quarter compared with the voltage in the wire electrical discharge machining to cut the workpiece 6. Moreover, a pulse of the current flow into the wire electrode 5 is varied to, for example about a twice in pulse width. As a result, the electrical processing condition is shifted from the cutting phase to the welding phase in which the welded spot or coalescence 20 is produced between the cut-out part 26 and the workpiece 6 by an arc welding with the use of the wire electrode 5. With the electrical processing condition in the welding phase, the workpiece 6 is cut to produce the part 26 and at the same time the part 26 partially is weld together with the workpiece 6 to make the welded spot or the coalescence 20 along their opposite portions. The opposite portions here mean any edge portions of the workpiece 6 and the cut-out part 26 confronting each other across the cutting path of kerf 21. The welded spots with the wire electrode 5 are made offset or biased on the workpiece 6 towards either of one surface of the workpiece 6 closer to the upper head 2 and the opposite surface of the workpiece 6 closed to the lower head 4. Moreover, the welded spot 20 of the cut-out part 26 with the workpiece 6, because made on only the edge (only upper side in FIG. 7), can be easily broken with a bit of impact. After completion of the electrical discharge machining, the welded spots 20 are broken with weak external impact. Thus, the application of external impact on the part 26 causes breakage of the welded spots 20, making it easier to cut off the part 26 apart from the workpiece 6. Although the welded spot 20 between the cut-out part 20 and the workpiece 6 may be broken with a weak external impact, the breakage load-bearing capacity on the welded spots 20 of the cut-out part 26 with the workpiece 6 was as shown in FIG. 8.

The basic principle of the method of making the welded spots in the wire electrode discharge machining according to the present invention will be described later with reference to FIGS. 2 and 3. However, the cutting and the welding phases in the method of cutting the part with making welded spots, as being same in details with the cutting and the welding phases disclosed in the commonly-assigned Japanese Patent Appln. No. 2011-212 221 (Publication No. 2012-166 332), will be explained in brief hereinafter.

Figure 2:
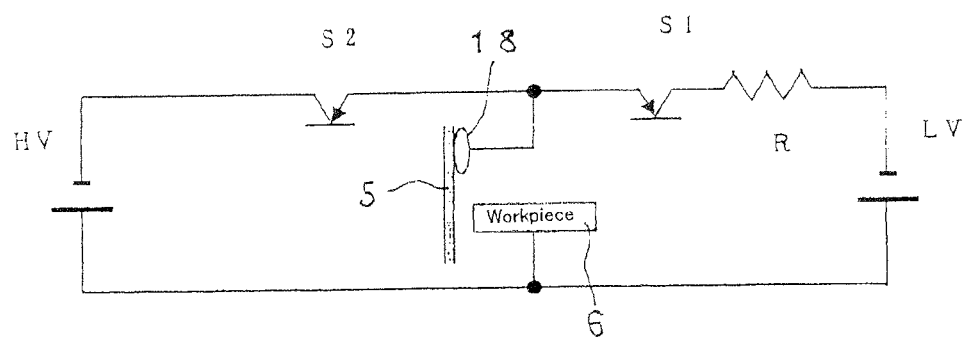
FIG. 2 is a circuit diagram to show a basic circuitry to carry out the method of cutting out a part with making welded spots in wire electrical discharge machining.

An electric circuitry shown in FIG. 2 has a first circuit in which an inter-electrode space between the wire electrode 5 and the workpiece 6 is connected in series with a first switch S1 and a low-voltage load LV combined with a resistance R to confirm the inter-electrode state between the charged electrodes, and a second circuit in which the space between the wire electrode 5 and the workpiece 6 is connected in series with a second switch S2 and a high-voltage load HV for the electric discharge processing, and the first and second circuits being connected in parallel with each other. The first circuit is provided to mainly confirm the state of the inter-electrode space between the wire electrode 5 and the material 6.

More especially, the first circuit is a detector to determine whether the wire electrode 5 is kept at a correct geometric relation with the workpiece 6 to carry out the electrical-discharge processing.

The function of the resistance R is to adjust the amount of electricity flowing through the first circuit. The switch S1 is on/off controlled in time for in advance to the electrical-discharge machining of the workpiece 6. In contrast, the second circuit is provided for the discharge processing or machining and has no resistance therein because of ensuring a large amount of electricity at discharge machining of the workpiece 6.

Next, the cutting or machining phase and the welding phase in the method of cutting the workpiece with making welded spots in the wire electrode discharge machining according to the present invention will be explained in detail later.

In the routine or ordinary cutting or machining phase shown in FIG. 3(A), after the first switch S1 has been turned on to generate a pulse, a matter of 80 V of the low-voltage load LV is created across the inter-electrode space between the wire electrode 5 and the workpiece 6 for about 2 μ sec to confirm whether the wire electrode 5 is kept at a correct geometric relation with the workpiece 6. When the inter-electrode relation is in adequate condition, the discharge occurs across the space between two charged electrodes. Subsequently, the first switch S1 is turned off and the second switch S2 is turned on to generate a pulse to get a current of, for example a matter of 400V flowing for about 0.8 μ sec to the wire electrode 5 and about 24 0V of the high-voltage load HV is impressed across the inter-electrode space between the wire electrode 5 and the workpiece 6 to machine or cut the workpiece 6 with electrical discharge.

In the welding phase shown in FIG. 3(B) to make a coalescence or a welded spot between the cut-out part 26 and the workpiece 6, after the first switch S1 has been turned on to generate a pulse, about 80V of the low-voltage load LV is created across the inter-electrode space between the wire electrode 5 and the workpiece 6 for about 2 μ sec to confirm whether the wire electrode 5 is kept at a correct geometric relation with the workpiece 6. When the inter-electrode relation is in adequate condition, the discharge occurs across the space between two charged electrodes. Then, the first switch S1 is turned off and the second switch S2 is turned on to generate a pulse to get a current of, for example, a matter of 110 V flowing for about 3 μ sec to the wire electrode 5, and about 70 V or a quarter the voltage in the cutting phase of the high-voltage load HV is applied across the inter-electrode space between the wire electrode 5 and the workpiece 6 to generate an arc discharge to fuse the wire electrode 5, producing coalescence to weld together the workpiece 26 and the workpiece 6.

Figure 4:
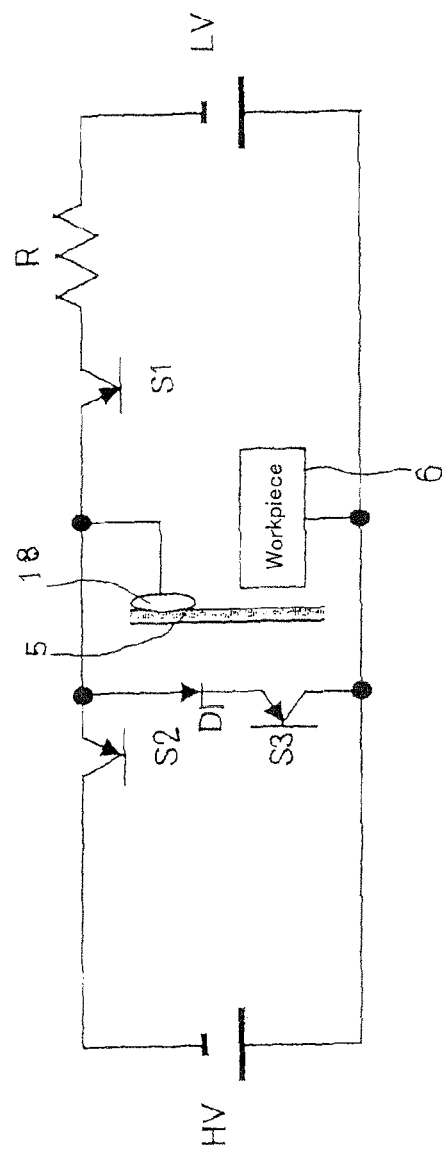
FIG. 4 is a schematic wiring diagram explaining an embodiment of the principle of the method of cutting out a part with making the welded spots in wire electrical discharge machining according to the present invention.

Moreover, the concrete embodiments in the method of making the welded spots in the wire electrode discharge machining according to the present invention will be described with reference to FIGS. 4 and 5. The basic circuitry to accomplish the method of making spots in the wire electrode discharge machining according to the present invention is composed of a first circuit in which an inter-electrode space between the wire electrode 5 and the workpiece 6 is connected in series with a low-voltage load LV combined with a resistance R to confirm an inter-electrode state between charged electrodes and a first switch S1, a second circuit in which the space between the wire electrode 5 and the workpiece 6 is connected in series with a high-voltage load HV for the electric discharge cutting and a second switch S2, a third circuit in which the space between the wire electrode 5 and the workpiece 6 is connected in series with a first diode D1 and a third switch S3, and the first, second and third circuits being connected in parallel with each other. With the circuitry constructed as stated just earlier, phase-change from the cutting phase to the welding phase is executed by on/off control of the switches S1, S2 and S3.

Especially in FIG. 5, the quantitative figures regarding first switch S1, second switch S2 and third switch S3 should be considered to be only illustration for better understanding of this invention. Moreover, the voltage wave form (V) and the current wave form (A) themselves also should be considered to be by way of illustration only. Thus, it is to be noted that the duration of time to keep the first switch S1 "ON" is not settled in conformity with the discharge condition, but determined depending on the state between the wire electrode 5 and the workpiece 6, for example parameters varying according to the power source for discharge processing, quality of the wire electrode 5, diameter of the wire electrode 5, and quality, thickness and so on of the workpiece 6. The duration of time to keep the first switch S1 "ON", although normally a few μ sec or tens of μ sec, is represented as 2u sec by way of illustration only in the following description of the machining or cutting phase and the welding phase. Next, the duration of time to keep the second switch S2 "ON", although determined in conformity with the cutting condition or parameter inputs, is represented as 0.8 μ sec by way of illustration only in the following description of the cutting phase and welding phase. In FIG. 5(B), moreover, the current flow intervals of the current wave form and the time intervals of impressed voltage of the voltage wave form, although not determined with the cutting or machining condition and unsettled, is represented as 3 μ sec by way of illustration only in the following description of the machining or cutting phase and the welding phase.

With the method of making the welded spots, for the cutting phase for the workpiece 6 by the wire electrode 5 with the basic circuitry as stated earlier, the first switch S1 is turned on to energize the low-voltage load LV to apply a potential difference across the inter-electrode space between the wire electrode 5 and the workpiece 6. Then, the first switch S1 is turned off and the second switch S2 is turned on to energize the high-voltage load HV to execute the cutting phase. With the welding phase to weld together the cut-out workpiece 26 and the workpiece 6, the first switch S1 is turned on while the third switch S3 is kept turned on to energize the low-voltage load LV to apply a potential difference across the inter-electrode space between the wire electrode 5 and the workpiece 6. Then, the first switch S1 is turned off and the second switch S2 turns on to energize the high-voltage load HV and finally the second switch S2 is turned off to execute the welding phase. With the on/off control of the switches as stated earlier, the electrical processing condition is switched over from the voltage/ampere wave form of the cutting phase in which the wire electrode 5 cuts the workpiece 6 to another voltage/ampere wave form of the welding phase in which the cut-out part 26 is welded together with the workpiece 6. In the welding phase, although the second switch S2 is turned off after a lapse of a fixed interval of time, the third switch S3 remains "ON" and therefore a circulating current passing through the first diode D1 and the third switch S3 flows across the inter-electrode space between the workpiece 6 and the wire electrode 5 to generate an electric current long in pulse width. As a result, the spark condition turns into the arc discharge by which the wire electrode 5 makes the coalescence spot or the welded spot between the cut-out part 26 and the workpiece 6 to weld together the part 26 with the workpiece 6.

The cutting and the welding phases in the method of cutting the part with making welded spots, as being same in details with the cutting and the welding phases disclosed in the commonly-assigned Japanese Patent Appln. No. 2011-212 221 (Publication No. 2012-166 332), will be explained in brief hereinafter.

One example of the cutting phase in the method of cutting out the part from the workpiece with making welded spots in the wire electrode discharge machining according to the present invention will be described later with reference to FIGS. 4 and 5(A).

In first step, the first switch S1 is turned on to energize the low-voltage load LV. After the lapse of time, for example about 2 μ sec, the discharge occurs between the inter-electrode space between the wire electrode 5 and the workpiece 6.

In second step, after the second switch S2 has been turned on, the voltage drop triggers off the application of the high-voltage load HV and the electric current rises to cause the spark discharge in which the cutting or machining of the workpiece 6 by the wire electrode 5 is carried out.

In third step, the electrical-discharge machining time between the wire electrode 5 and the workpiece 6, though determined dependent on processing condition of the workpiece 6, is for example about 0.8 μ sec.

In fourth step, after the first, second and third switches S1, S2 and S3 have been once turned off, the potential difference across the inter-electrode space between the wire electrode 5 and the workpiece 6 becomes lost in load, resulting in downtime.

The cutting path or kerf 21 in the workpiece 6 is completed by the wire electrode 5 through repetition of the cycle of the steps as stated just above with the period of 125 k ~2000 kHz.

Moreover, one example of the welding phase in the method of cutting out the part from the workpiece with making welded spots in the wire electrode discharge machining according to the present invention will be explained later with reference to FIGS. 4 and 5(B).

In first step, the first switch S1 is turned on to energize the low-voltage load LV. After the lapse of time, for example about 2 μ sec, the discharge occurs between the inter-electrode space between the wire electrode 5 and the workpiece 6.

In second step, after the second switch S2 has been turned on, the voltage drop triggers off the application of the high-voltage load HV and the electric current rises to cause the spark discharge in which the cutting or machining of the workpiece 6 by the wire electrode 5 is carried out.

In third step, upon change-over from the machining or cutting phase to the welding phase, the second switch S2 is turned off after the lapse of a fixed interval of time. However, the third switch S3 remains "ON" and, therefore, a circulating current flows across the inter-electrode space between the workpiece 6 and the wire electrode 5 to generate an electric current long in pulse width, when the wire electrode 5 fuses to produce coalescence or the welded spot between the cut-out part 26 and the workpiece 6, thereby welding the cut-out part 26 with workpiece 6.

In fourth step, after the circulating current has been consumed completely, the third switch S3 is turned off, resulting in downtime.

Figure 6:
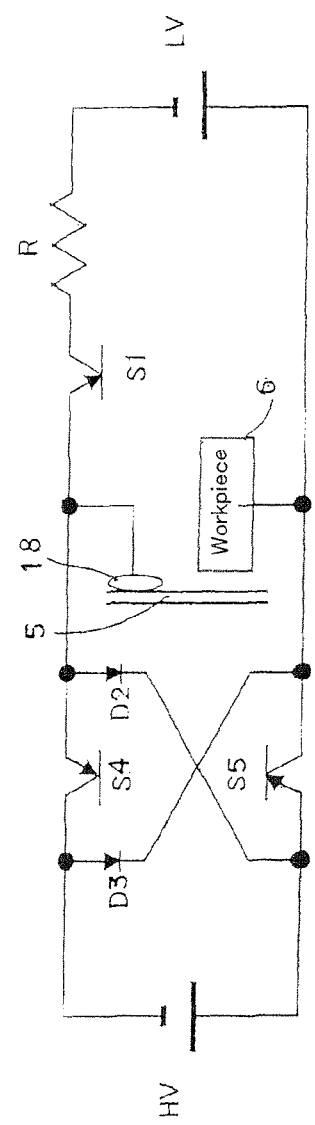
FIG. 6 is a schematic wiring diagram explaining an embodiment to carry out the method of cutting out the part with making the welded spots in wire electrical discharge machining according to the present invention.

Another example of the cutting phase in the method of cutting out the part from the workpiece with making welded spots in the wire electrode discharge machining according to the present invention will be described later with reference to FIG. 6.

In first step, the first switch S1 is turned on to energize the low-voltage load LV. After the lapse of time, for example about 2 μ sec, the discharge occurs between the inter-electrode space between the wire electrode 5 and the workpiece 6.

In second step, after the second switch S2 has been turned off and the fourth switch and fifth switch S are turned on, the voltage drop triggers off the application of the high-voltage load HV and the electric current rises to cause the spark discharge in which the cutting or machining of the workpiece 6 by the wire electrode 5 is carried out.

In third step, while the fourth switch S4 and the fifth switch S5 are kept at turned-on state, the electrical-discharge machining time between the wire electrode 5 and the workpiece 6, though determined dependent on processing condition of the workpiece 6, is for example about 0.8 μ sec.

In fourth step, after the fourth switch S4 has been turned off while the fifth switch S5 is kept at turned-on state, the fifth switch S5 is turned on for only sub-μ sec to release the energized state of the high-voltage load HV to bring the current waveform closer to a trapezoid.

In fifth step, after the first, fourth and fifth switches S1, S4 and S5 have been once turned off, the potential difference across the inter-electrode space between the wire electrode 5 and the workpiece 6 becomes lost in load, resulting in downtime.

The cutting path or kerf 21 in the workpiece 6 is completed by the wire electrode 5 through repetition of the cycle of the steps as stated just above with the period of 125 k ~2000 kHz.

Another example of the welding phase in the method of cutting out the part from the workpiece with making welded spots in the wire electrode discharge machining according to the present invention will be explained later with reference to FIG. 6.

In first step, the first switch S1 is turned on to energize the low-voltage load LV. After the lapse of time, for example about 2 μ sec, the discharge occurs between the inter-electrode space between the wire electrode 5 and the workpiece 6.

In second step, after the fourth switch S4 and the fifth switch S5 have been turned on, the voltage drop triggers off the application of the high-voltage load HV and the electric current rises to cause the spark discharge in which the cutting or machining of the workpiece 6 by the wire electrode 5 is carried out.

In third step, the fourth and fifth switches S4 and S5 are kept at the "on" state and the discharge occurs for the discharge time determined depending on the processing condition, for example a matter of 0.8 μ sec.

In fourth step, the fourth switch S4 is turned off after the lapse of a fixed interval of time. However, the fifth switch S5 remains "ON" state and, therefore, a circulating current flows across the inter-electrode space between the workpiece 6 and the wire electrode 5 to release the energization of the high-voltage load HV to generate an electric current long in pulse width, when the arc is maintained between the workpiece 6 and the cut-out part 26 to weld together them.

In fifth step, after the circulating current has been consumed completely, the fifth switch S5 turns off, resulting in downtime.

A preferred embodiment of the electric circuitry to carry out the method of cutting out the part from the workpiece with making welded spots in the wire electrode discharge machining according to the present invention will be described later with reference to FIG. 6. Here, the voltage waveforms and the current waveforms occurring on the on/off control of the first, fourth and fifth switches S1, S4 and S5 in the electric circuitry of FIG. 6 are left out.

The embodied circuitry to accomplish the method of cutting out the part from the workpiece with making welded spots in the wire electrode discharge machining according to the present invention is composed of a first circuit in which an inter-electrode space between the wire electrode 5 and the workpiece 6 is connected in series with a low-voltage load LV combined with a resistance R to confirm an inter-electrode state between charged electrodes and a first switch S1, a second circuit in which the inter-electrode space between the wire electrode 5 and the workpiece 6 is connected in series with a high-voltage load HV for the electric discharge cutting, a fourth switch S4 and a fifth switch S5, a third circuit in which the inter-electrode space between the wire electrode 5 and the workpiece 6 is connected in series with a second diode D2 and a fifth switch S5, and a fourth circuit in which an inter-electrode space between the wire electrode 5 and the workpiece 6 is connected in series with a third diode D3 and a fourth switch S4, and the first, second, third and fourth circuits being connected in parallel with each other. With the circuitry constructed as stated just earlier, when the fourth and fifth switches S4 and S5 are turned on, the inter-electrode space between the wire electrode 5 and the workpiece 6 is energized with the high-voltage load HV.

Change-over of the electrical processing condition from the machining or cutting phase to the welding phase in the electric circuitry constructed as stated earlier is executed with the on/off control of the first, fourth and fifth switches S1, S4 and S5. After the fourth switch S4 has turned off under the condition the fifth switch S5 has been kept at "OFF" state, a first circulating current passing through the second diode D2 and the fifth switch S5 flows across the inter-electrode space between the wire electrode 5 and the workpiece 6. In contrast, after the fifth switch S5 has turned off under the condition the fourth switch S4 has been kept at "ON" state, a second circulating current passing through the third diode D3 and the fourth switch S4 flows across the inter-electrode space between the wire electrode 5 and the workpiece 6. In the electric circuitry discussed now, the first and second circulating currents are allowed to flow alternately with the ON/OFF control of the first, fourth and fifth switches S1, S4 and S5. With the method of cutting out the part from the workpiece with making welded spots in the wire electrode discharge machining according to the present invention, as two circulating currents are generated by using the electric circuits having the diodes D2 and D3 therein, the waveform of the current for discharge machining nears trapezoidal shape. Thus, alternate occurrence of the two circulating currents makes it possible to alleviate or lessen a problem of generation of heat caused by switching action. With the method of cutting out the part with making welded spots, as the cut-out part 26 and the workpiece 6 are welded together by using the circulating currents, the waveform of the current can be lowered more slowly, compared with the discharge machining of the workpiece 6.

Moreover, the ON/OFF timing of the fourth and fifth switches S4 and S5 may be reversed each other.

The method of making welded spots on the part in the wire electrode electrical discharge machining will be explained later regarding punching operation and die plate process in die manufacturing from the workpiece 6. The cutting phase and the welding phase in the method of cutting out the part with making the partially welded spots in the wire-cut discharge are shown in detail in the commonly-assigned JP publication No. 2012-166 332, the disclosure of which is incorporated herein by reference. Incidentally, in the punching operation in the wire discharge processor, the part 26 of preselected contour is cut out from the workpiece 6 and used as a blanking part for the product. The workpiece 6 has the start hole 19 other than the part 26. As alternatives, the start hole 19 is anew made is made anywhere other than the part 26 in the workpiece 6 or the start hole 19 is provided outside of the workpiece 6. In contrast with the above, in the die plate process in which the part 26 of the preselected contour is gouged out of the workpiece 6, the gouged-out part 26 is called the core which becomes disused article, whereas the residual workpiece 6 is used as the blanking part for the production. The start hole is made in the gouged-out part 26 called for the core or opened anew in the location of the gouged-out part 26.

Preferred embodiments of the method of making welded spots on the part in the wire electrode electrical discharge machining of the present invention will be described later with reference to FIGS. 9 to 18 illustrating processing steps to produce the die plate. In the following description of the present invention, the terms "perpendicular, upright" used regarding the wire electrode 5 or workpiece 6 are envisaged including not only the exact right angle or 90 degrees with respect to upper and lower surfaces 33, 34 of the flat workpiece 6, but a substantially perpendicular or upright near to 90 degree involving nearly perpendicular and roughly perpendicular. The terms "lean, tilt, incline, slant" used regarding the wire electrode 5 and workpiece 6 are envisaged including the substantial incline relative to upper and lower surfaces 33, 34 of the flat workpiece 6.

Figure 9:
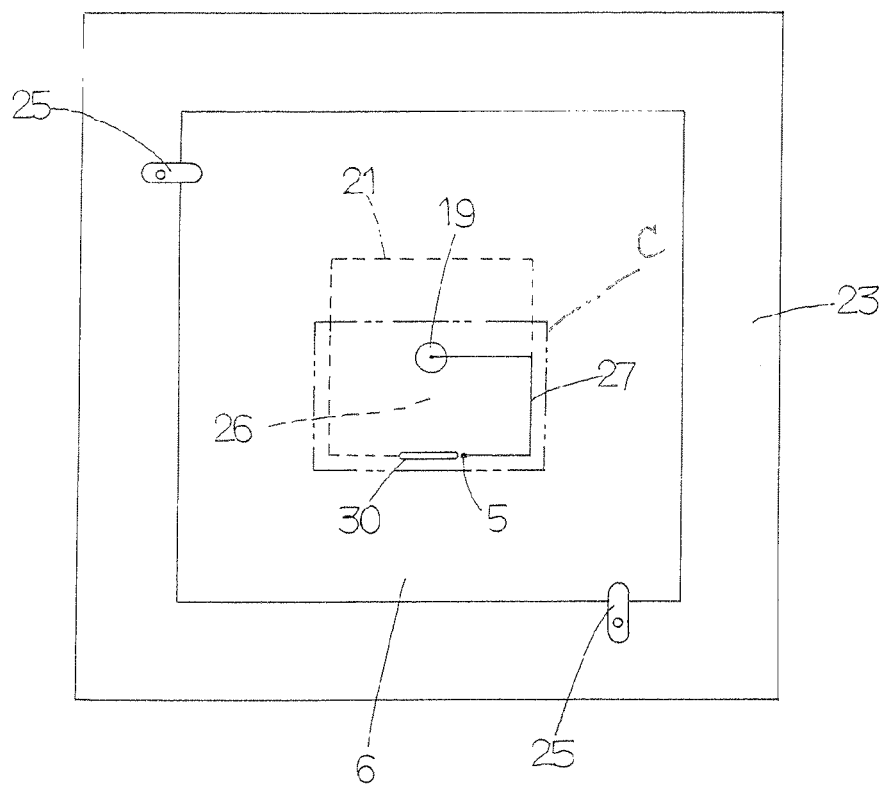
FIG. 9 is a schematic view in plan showing a method of welding the cut-out part with the workpiece in the wire-electrode discharge according to the present invention.

Referring to FIG. 9, there is shown a blanking workpiece 6 is placed on a worktable 23 lying between the upper head 2 and the lower head 4 and fastened to the worktable 23 with clamps 25. The workpiece 6 made of two sheets of plates overlapped one over the other is cut by spark discharge machining along a desired contour 21 shown with a dotted line. The workpiece 6 is cut with spark discharge machining along the cutting path or kerf 27 beginning with a start hole 19 and extending as shown with a solid line. On the phase illustrated here, the wire electrode 5 is positioned at the foremost edge of the cutting path or kerf 27, where the wire electrode 5 has to make a welded spot on slant cutting surface 30.

Figure 10:
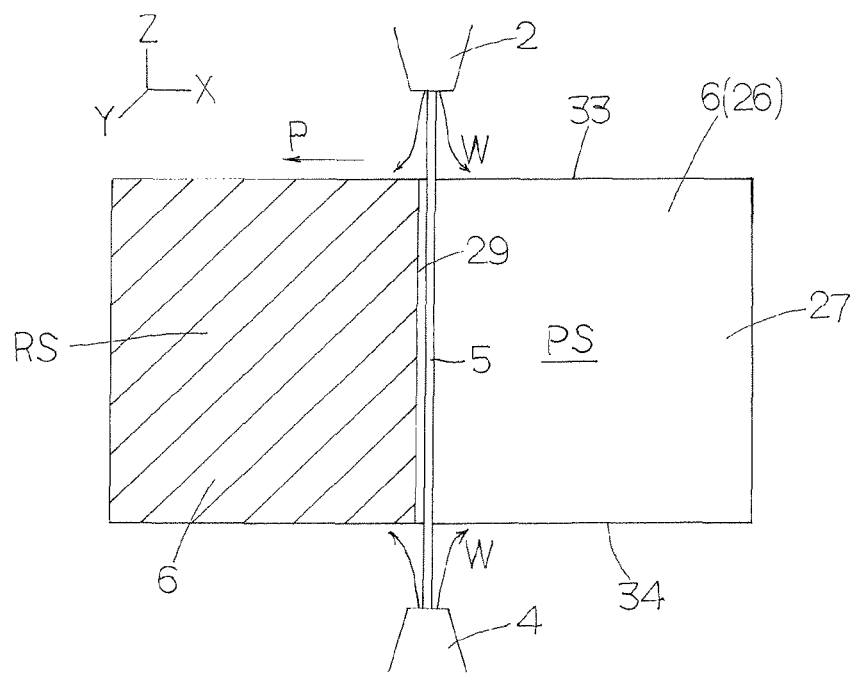
FIG. 10 is a schematic view explanatory of a rough cutting step carried out with the wire electrode held in a substantially perpendicular posture relative to the upper and lower surfaces of the workpiece in the method of cutting out a part from a workpiece while making a welded spot on the part according to the present invention.

Referring to FIG. 10, the workpiece 6 is cut with the spark discharge machining to have a substantially perpendicular or upright cutting surface 29 on which the upper head 2 and the lower head 4 are in common on an upright line in a thickness direction of the workpiece 6, or a substantially upright direction perpendicular to the upper surface 33 and the lower surface 34 of the workpiece 6. Thus, the substantially perpendicular wire electrode 5 lying in the thickness direction of the workpiece 6 goes ahead in the direction P of travel while spark discharge cutting the workpiece 6. A PS area in the workpiece 6 shows the cutting surface in the cutting path or kerf 27 made by the spark discharge machining and an RS area shows an uncut area which has yet to be processed with the spark discharge machining. The wire electrode 5 cuts the workpiece 6 with the spark discharge machining while threading or extending between the upper head 2 and the lower hear 4 so as to keep the upright or perpendicular posture with respect to the workpiece 6. Moreover, the spark discharge machining on the workpiece 6 is carried out with jet stream W of water fed as shown by arrows.

Figure 11:
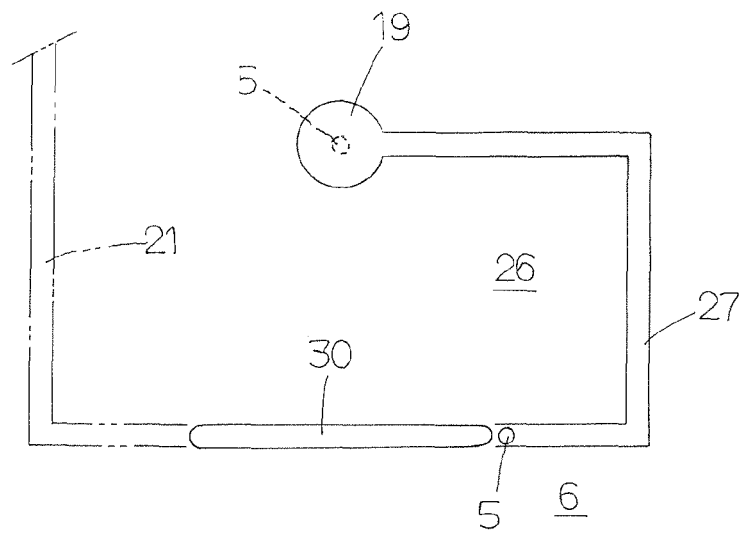
FIG. 11 is an enlarged view in plan showing in detail the area C in FIG. 9.
Figure 12:
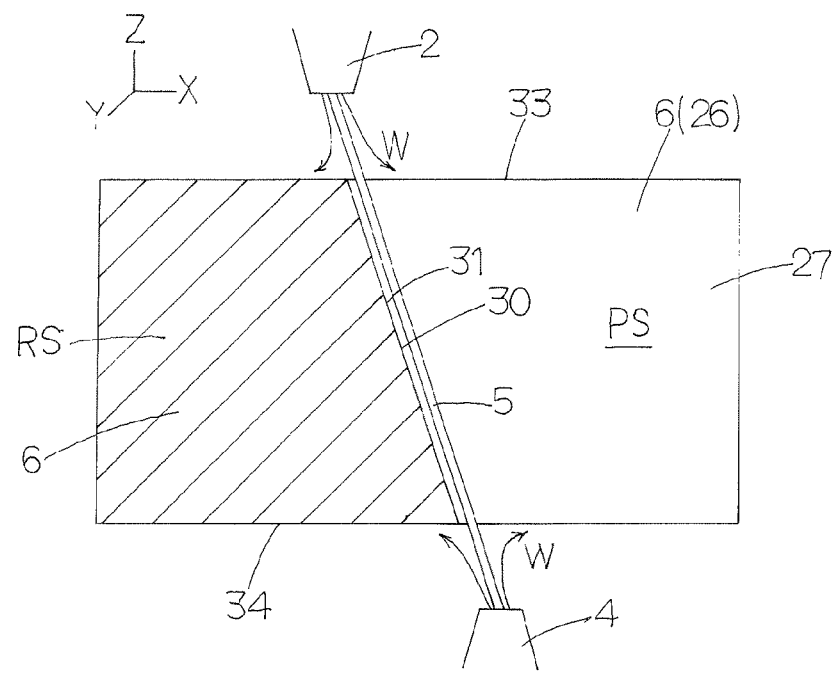
FIG. 12 is a schematic view in section showing a kerf rough cut with the wire electrode held in a tilt posture relative to the upper and lower surfaces of the workpiece in the method of cutting out a part from a workpiece while making a welded spot on the part according to the present invention.

Further referring to FIG. 11 showing an enlarged view of an area C enclosed with two-dot chain line in FIG. 9, the wire electrode 5 extending in perpendicular to the upper and lower surfaces of the workpiece 6 as shown in FIG. 10 is shown as being positioned just before a location where the welded spot is made between the cut-out part and the workpiece 6 after spark discharge cutting over a preselected distance along the desired cutting contour 21 in the workpiece 6. Subsequently, the wire electrode 5 comes to cut the workpiece 6 in a tilted posture to make a slant cutting surface 30. Referring especially to FIG. 12, the upper head 2 further goes ahead of the lower head 4 in the direction of travel along the desired contour 21 while cutting the workpiece 6 with the spark discharge machining to make the slant cutting surface 30 in the workpiece 6. To this end, the lower head 4 stays still relative to the upper head 2 while grasping the wire electrode 5. With the wire discharge processor, the wire electrode 5 tilted to a preselected direction carries out rough cutting on the workpiece 6 with the spark discharge in the cutting phase of the electrical processing condition. After the upper head 2 has gone ahead of the lower head 4 across a preselected distance, the slant cutting surface 30 is made in the workpiece 6.

Figure 13:
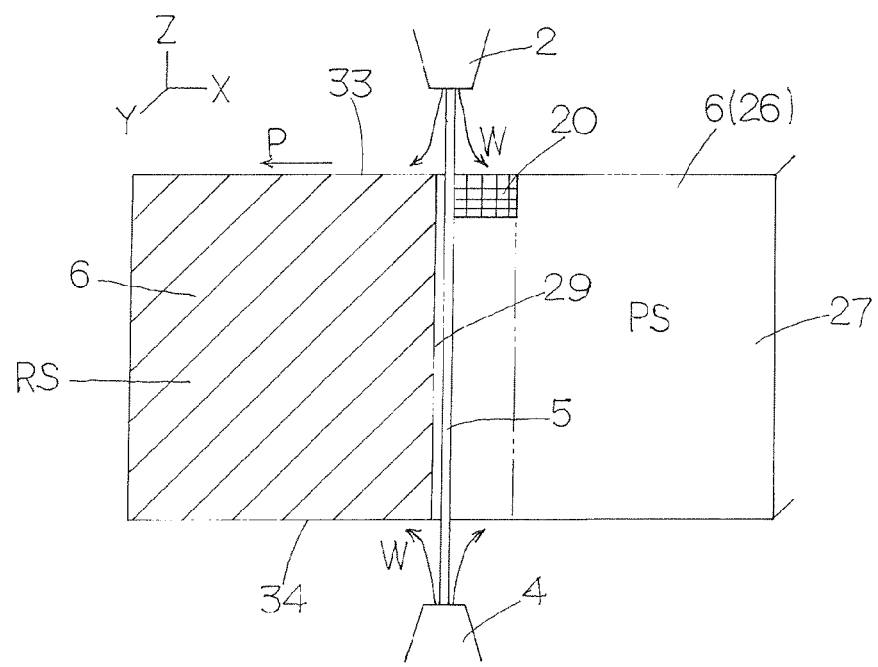
FIG. 13 is a schematic view in section showing a welded spot made with a substantially perpendicular wire electrode in a welding phase at an upper edge of the kerf rough cut with the wire electrode held in a upright posture relative to the upper and lower surfaces of the workpiece in the method of cutting out a part from a workpiece while making a welded spot on the part according to the present.

In FIG. 13, there is shown a typical prior art of the welding phase in which the wire electrode 5 is in an upright posture substantially perpendicular to the upper surface 33 and the lower surface 34 of the workpiece 6. With the situation as stated just earlier, after the electrical processing condition of the wire electrode discharge processor has been switched over from the cutting phase to the welding phase, the cut-out part 26 is connected to the workpiece 6 with a welded spot or coalesce 20 as shown in FIG. 13. More especially, after the welding phase is carried out on the workpiece 6, the welded spot or coalesce 20 is formed across only a slight depth of the cutting path or kerf starting with the upper surface 33 of the workpiece 6, whereas the part 26 below the welded spot 20 remains cut away or isolated from the workpiece 6 across the cutting path or kerf. With the method of making partially welded spots in the wire-cut electrical discharge processor shown in FIG. 13, thus, no welded spot could be formed at different locations intermediate or lower in the thickness of the workpiece 6.

Figure 14:
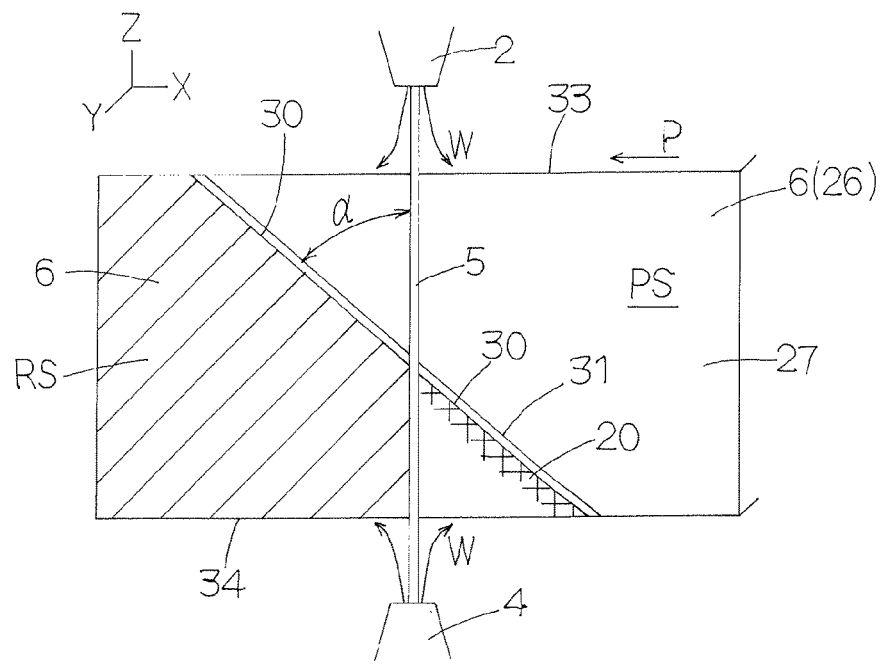
FIG. 14 is a schematic view in section showing a welded spot made with a substantially perpendicular wire electrode relative to the upper and lower surfaces of the workpiece in a welding phase along a slant kerf in the workpiece in the method of cutting out a part from a workpiece while making a welded spot on the part according to the present.

In FIG. 14, there is shown an embodiment of the method of making the welded spots in the wire electrical discharge machining according to the present invention. The workpiece 6 has a slant cut surface 30 which was previously rough cut with using the wire electrode 5 at a preselected angle α. The wire electrode 5 is first altered from the tilted posture shown in FIG. 12 to the upright posture substantially perpendicular to the upper and lower surfaces 33, 34 of the workpiece 6 as shown in FIG. 14. Then, the electrical processing condition is switched over from the cutting phase to the welding phase to execute the welding step on the cut-out part 26. On the welding phase described now, the slant cut surface 30 made in the workpiece 6 would be accounted to be an imaginative slant upper surface 31 of the workpiece 6 at an ingress side for the wire electrode 5. As a result, while the wire electrode 5 carries out the welding step from the lowest end of the imaginative slant upper surface 31 of the workpiece 6, the welded spot 20 to join the cut-out part 26 and the workpiece 6 together is formed along the slant cut surface 30 upward from the lowest end.

Figure 15:
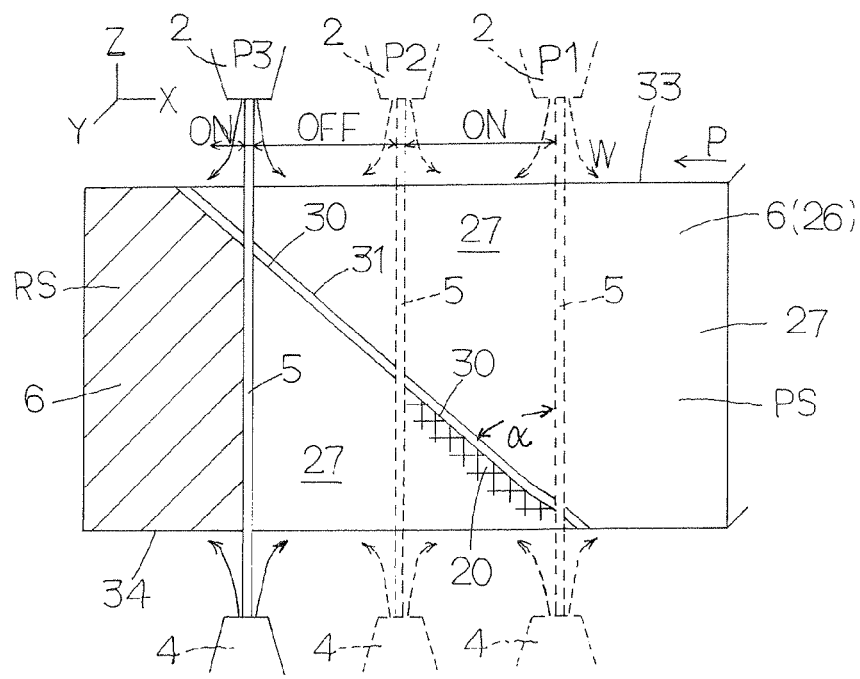
FIG. 15 is a schematic view in section showing the welded spots made at the lower areas with a substantially perpendicular wire electrode relative to the upper and lower surfaces of the workpiece in a welding phase at preselected lower areas along a slant kerf in the workpiece in the method of cutting out a part from a workpiece while making a welded spot on the part according to the present.

In FIG. 15, there is shown another embodiment of the method of making the welded spots in the wire electrical discharge machining according to the present invention. The workpiece 6 has a slant cut surface 30 which was previously rough cut with using the wire electrode 5 at a preselected angle α. The cut-out part 26 is shown as being welded to the workpiece 6 across an area on slant cut surface 30 in the workpiece 6 extending from a first location P1 to a middle location P2. To this end, the electrical processing condition is switched over at the location P1 from the cutting phase to the welding phase to execute the welding step on the workpiece 6. Thereafter, the electrical processing condition is switched over at the location P2 from the welding phase to the cutting phase to cut out the part 26 from the workpiece 6 with spark discharge along the desired contour 21. Then, the electrical processing condition is switched over at the location P3 from the cutting phase to the welding phase to execute the welding step on the workpiece 6. Thus, the wire electrode 5 at the location P3 resumes doing the welding phase along the slant cut surface 30 to weld the cut-out part 26 with the workpiece 6.

Figure 16:
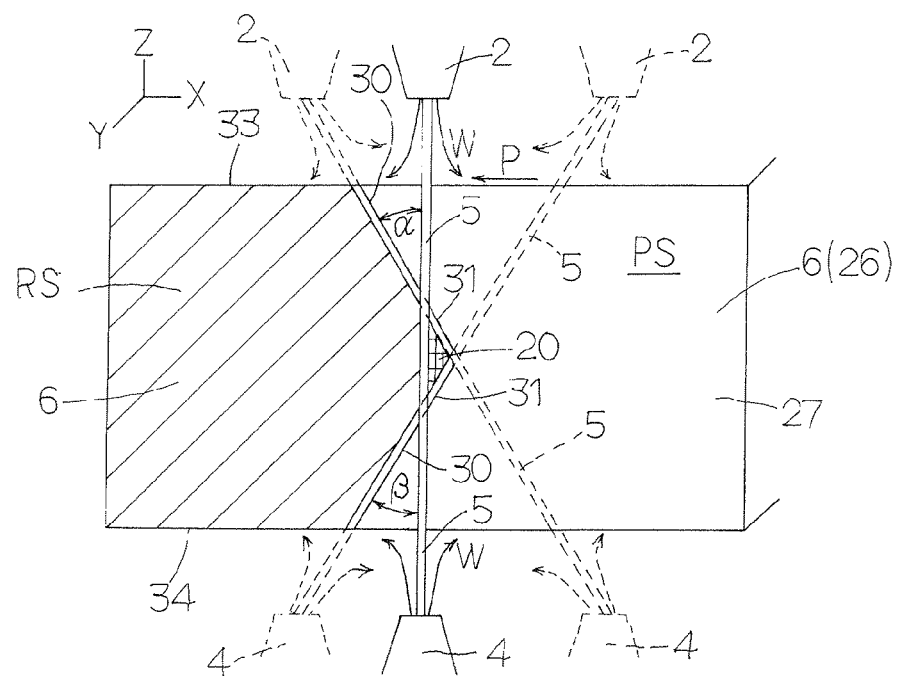
FIG. 16 is a schematic view in section showing the welded spot made with a substantially perpendicular wire electrode in a welding phase at an uncut area left midway between the upper and lower surfaces of the workpiece after the tilted wire electrode has made slant cut surfaces or kerfs crossing each other in the workpiece in the method of cutting out a part from a workpiece while making a welded spot on the part according to the present.

In FIG. 16, there is shown a further another embodiment of the method of making the welded spots in the wire electrical discharge machining according to the present invention. The workpiece 6 has the slant cut surfaces 30 which were machined in the workpiece 6 with spark discharge along the desired contour 21. The slant cut surfaces 30 intersect each other in such a relation that one of the slant cut surfaces 30 is machined with an angle α of inclination relative to the upper and lower surfaces 33, 34 of the workpiece 6 and another of the slant cut surfaces 30 is an angle β of inclination relative to the upper and lower surfaces 33, 34 of the workpiece 6. To this end, one of the slant cut surfaces 30 is made an angle α of inclination relative to the upper and lower surfaces 33, 34 of the workpiece 6 and another of the slant cut surfaces 30 is an angle β of inclination relative to the upper and lower surfaces 33, 34 of the workpiece 6. More especially, the upper head 2 first goes ahead of the lower head 4 in the direction of travel along the desired contour 21 while cutting the workpiece 6 with the spark discharge machining to make one of the slant cutting surfaces 30 in the workpiece 6. Then, the upper head 2 goes back of the lower head 4 in the direction of travel along the desired contour 21 while cutting the workpiece 6 with the spark discharge machining to make another of the slant cutting surfaces 30 in the workpiece 6. Subsequently, after the wire electrode 5 has been varies in posture from the tilt shown with a dotted line in FIG. 16 to the substantially upright depicted with a solid line, the electrical processing condition is switched from the cutting phase to the welding phase where the welding step is carried out from the peak midway between the upper and lower surface 33, 34 of the workpiece 6 along the imaginative slant upper surfaces 31 crossing each other. Thus, the cut-out part 26 is welded with the workpiece 6 at the uncut peak midway between the upper and lower surface 33, 34 of the workpiece 6 as the welding process is carried out along the imaginative slant upper surfaces 31 to make the welded spot 20 atop the peak of the slant cutting surfaces 30. Namely, after the upper head 2 and the lower head 4 have moved each other to bring the wire electrode 5 in perpendicular to the upper and lower surfaces 33, 34 of the workpiece 6, the electrical processing conditions are switched from the cutting phase to the welding phase to carry out the welding step, thereby to form the welded spot 20.

Figure 17:
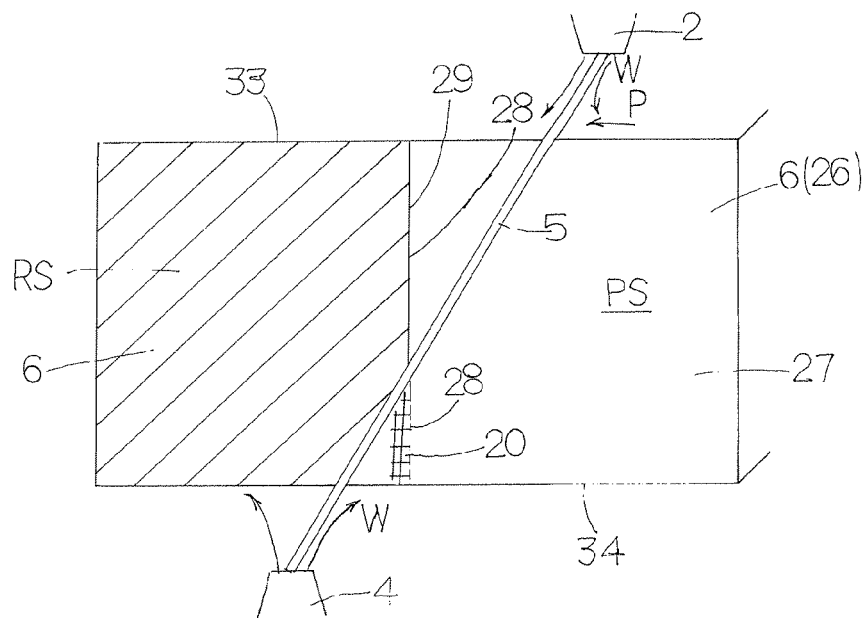
FIG. 17 is a schematic view in section showing the welded spot made with a tilted electrode in a welding phase across an upright interval starting from the bottom of the workpiece in the upright cut surface or kerf which has been previously made with the substantially perpendicular wire electrode in the method of cutting out a part from a workpiece while making a welded spot on the part according to the present.

In FIG. 17, after the upper head 2 and the lower head 4 have been set in such a relation to keep the wire electrode 5 in an upright posture substantially perpendicular to the upper and lower surfaces 33, 34 of the workpiece 6, the workpiece 6 is rough cut with spark discharge in the upright direction perpendicular to the upper and lower surfaces 33, 34 of the workpiece 6 to form the upright cutting surface 29. On subsequent processing on the workpiece 6, the upright cutting surface 29 is accounted to be an imaginative upright upper surface 28 of the workpiece 6. The lower head 4 is moved to go ahead of the upper head 2 or the upper head 2 is moved to go back of the lower head 4 to get the wire electrode 5 tilted and then the electrical processing condition is switched over from the cutting phase to the welding phase to execute the welding procedure to join the cut-out part 26 and the workpiece 6 together upward from the lower surface 34. On the welding phase described now, the imaginative upright upper surface 28 of the workpiece 6 at an ingress side for the wire electrode 5 coincides with the upright cutting surface 29 so that the welded spot 20 is formed upward from below in the thickness direction of the workpiece 6 along the upright cutting surface 29 beginning with the bottom of the upright cutting surface 29. More especially, the welding phase is executed with the wire electrode 5 which is either of varied and fixed in angles of inclination. Desired relative movement between the worktable 23 and the wire electrode 5 of the wire electrode discharge processor is adequately controlled the X-Y coordinate for the worktable 23 and the U-V coordinate for the upper head 2.

Figure 18:
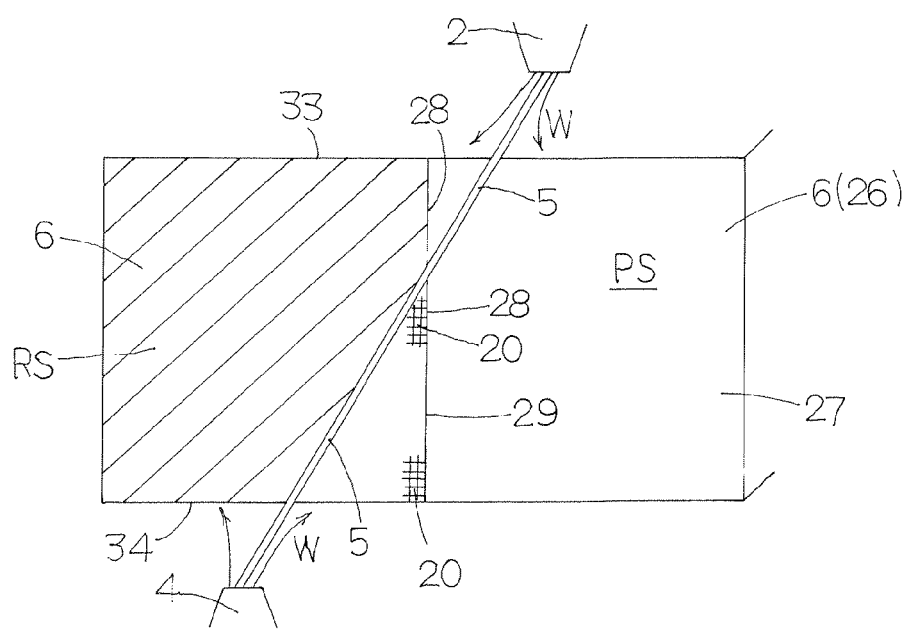
FIG. 18 is a schematic view in section showing the welded spot made with a tilted electrode in a welding phase at a lower level and a middle level in the upright cut surface or kerf which has been previously made with the substantially perpendicular wire electrode in the method of cutting out a part from a workpiece while making a welded spot on the part according to the present.

In FIG. 18, the upper head 2 and the lower head 4 are, as with in FIG. 17, set in such a relation to keep the wire electrode 5 in an upright posture substantially perpendicular to the upper and lower surfaces 33, 34 of the workpiece 6 and then the workpiece 6 is rough cut with spark discharge in the upright direction perpendicular to the upper and lower surfaces 33, 34 of the workpiece 6 to have the upright cutting surface 29 in the workpiece 6. On subsequent processing on the workpiece 6, the upright cutting surface 29 is accounted to be an imaginative upright upper surface 28 of the workpiece 6. The lower head 4 is moved to go ahead of the upper head 2 or the upper head 2 is moved to go back of the lower head 4 to get the wire electrode 5 tilted and then the electrical processing condition is switched over from the cutting phase to the welding phase to execute the welding procedure to join the cut-out part 26 and the workpiece 6 together upward from the lower surface 34. On the welding phase described now, the imaginative upright upper surface 28 of the workpiece 6 at an ingress side for the wire electrode 5 coincides with the upright cutting surface 29 so that the welded spot 20 is formed upward from below in the thickness direction of the workpiece 6 along the upright cutting surface 29 beginning with the bottom of the upright cutting surface 29. The electrical processing condition while in the welding phase is switched over from the welding phase to the cutting phase to execute the spark discharge machining on the workpiece 6. After a while, the electrical processing condition is again switched over from the cutting phase to the welding phase to make another welded spot 20 along the upright cutting surface 29. By repetition of alternate execution of the welding phase or welding step and the cutting phase or spark discharge on the workpiece 6, a plurality of welded spots 20, two spots in FIG. 18, is made from below in the thickness direction of the workpiece 6.

AVAILABILITY ON INDUSTRY

The method of making the welded spots in the wire electrode electrical of the present invention is preferably befitted for the wire-cut electrical discharge processor which is envisaged retaining the part cut out form the workpiece so as not to fall away from the workpiece.

DESCRIPTION OF REFERENCE SIGNS

1 Machine head
2 Upper head
4 Lower head
5 Wire electrode
6 Workpiece
7 Source bobbin
10 Wire-delivery roller
13 Feeder tube
15 Machine frame
20 Welded spot
21 Cut contour
22 Cutting path or kerf
26 Cut-out part
27 Cutting path
28 Imaginative upright upper surface
29 Upright cutting surface
30 Slant cutting surface
31 Imaginative slant upper surface
32 Guide roller
33 Upper surface
34 Lower surface
35 Winding rollers

What is claimed is:

1. A method of welding a cut-out part with a workpiece in wire electrode discharge machining, comprising of the steps of cutting a part to be separated from the workpiece with electrical discharge using spark energy generated by application of an inter-electrode voltage which occurs across a wire electrode and the workpiece lying in opposition to the wire electrode and, in doing so, changing an electrical processing condition applied across the wire electrode and the workpiece from a cutting phase to a welding phase at a preselected spot in a cutting path or kerf of the part, fusing at least partially the wire electrode and welding the part with the workpiece at the spot in a preselected contour of the part to retain the part on the workpiece, and further comprising of the steps of changing the electrical processing condition to the cutting phase at a preselected spot to weld the part with the workpiece, thereby carrying out the discharge machining to rough cut the workpiece in a thickness direction of the workpiece along a cutting contour in the workpiece to form a rough cut surface on the part, and then tilting the wire electrode in posture with respect to the rough cut surface lying in the thickness direction of the workpiece, subsequently changing the electrical processing condition to the welding phase to execute a welding process on the workpiece along the rough cut surface thereby forming the welded spot to weld the part with the workpiece along the rough cut surface at an ingress side of the workpiece for the wire electrode, the welded spot extending over a preselected length at a preselected area in the thickness direction of the workpiece to retain the part on the workpiece with the welded spot.

2. A method of welding a cut-out part with a workpiece in wire electrode discharge machining, as set forth in claim 1, wherein the rough cut surface on the workpiece is a slant cutting surface which is rough cut with the wire electrode while tilting or kept tilted with respect to the upper and lower surfaces of the workpiece, and then after wire electrode is changed from a posture lying on the slant cutting surface to a substantially upright posture perpendicular to the upper and lower surfaces of the workpiece, the welding process is carried out along the slant cutting surface at an ingress side of the workpiece for the wire electrode upward from a lower end of the slant cutting surface to form the welded spot of the preselected length at the preselected area in the thickness direction of the workpiece.

3. A method of welding a cut-out part with a workpiece in wire electrode discharge machining, as set forth in claim 2, wherein the welded spot to join the cut-out part with the workpiece is formed at a preselected location lying upward from a lower side of the slant cutting surface over a preselected length in the thickness direction of the workpiece.

4. A method of welding a cut-out part with a workpiece in wire electrode discharge machining, as set forth in claim 2, wherein the slant cutting surface on the workpiece is spark charge machined with using the wire electrode kept in a tilted posture in which an upper head goes ahead of a lower head along a desired cutting contour in the workpiece.

5. A method of welding a cut-out part with a workpiece in wire electrode discharge machining, as set forth in claim 2, wherein the slant cutting surface spark discharged on the workpiece is composed of two partially slant cutting surfaces intersected each other to form an uncut peak midway between the upper and lower surface of the workpiece, and the welded spot is formed at the uncut peak.

6. A method of welding a cut-out part with a workpiece in wire electrode discharge machining, as set forth in claim 1, wherein the rough cut surface on the workpiece is a substantially upright surface rough cut in the workpiece by the wire electrode kept at an upright posture substantially perpendicular to the upper and lower surfaces of the workpiece, and wherein the welding process is executed on the workpiece along the rough cut surface thereby forming the welded spot to weld the part with the workpiece along the rough cut surface at an ingress side of the workpiece for the wire electrode, the welded spot extending over a preselected length at a preselected area in the thickness direction of the workpiece.

7. A method of welding a cut-out part with a workpiece in wire electrode discharge machining, as set forth in claim 6, wherein the upper head to feed the wire electrode is moved to go back of the lower head along the cutting path or kerf made in the workpiece to get the wire electrode tilted in posture.

8. A method of welding a cut-out part with a workpiece in wire electrode discharge machining, as set forth in claim 6, wherein the upper head to feed the wire electrode is advanced ahead of the lower head to increase an angle of inclination of the wire electrode relative to the upper surface and the lower surface of the workpiece thereby to form the welded spot along the upright rough cutting surface while varying the angle of inclination of the wire electrode.

9. A method of welding a cut-out part with a workpiece in wire electrode discharge machining, as set forth in claim 1, wherein the welded spot on the rough cut surface is formed at one or more locations along the rough cut surface of the workpiece.

10. A method of welding a cut-out part with a workpiece in wire electrode discharge machining, as set forth in claim 1, wherein the spark discharge is carried out in the thickness direction of the workpiece composed of a plurality of layers overlapped one on the other to form the welded spot to join the part with the workpiece at least an undermost layer to retain the part on the workpiece.

* * * * *